(12) United States Patent
Jiang et al.

(10) Patent No.: US 10,993,237 B2
(45) Date of Patent: Apr. 27, 2021

(54) METHOD AND DEVICE IN USER EQUIPMENT AND BASE STATION FOR WIRELESS COMMUNICATION

(71) Applicant: SHANGHAI LANGBO COMMUNICATION TECHNOLOGY COMPANY LIMITED, Shanghai (CN)

(72) Inventors: Qi Jiang, Shanghai (CN); XiaoBo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 174 days.

(21) Appl. No.: 16/276,641

(22) Filed: Feb. 15, 2019

(65) Prior Publication Data

US 2019/0261346 A1    Aug. 22, 2019

(30) Foreign Application Priority Data

Feb. 17, 2018  (CN) .......................... 201810152593.1

(51) Int. Cl.
| | | |
|---|---|---|
| H04W 72/04 | (2009.01) | |
| H04L 5/00 | (2006.01) | |
| H04L 1/18 | (2006.01) | |
| H04W 56/00 | (2009.01) | |

(52) U.S. Cl.
CPC ......... *H04W 72/048* (2013.01); *H04L 1/1854* (2013.01); *H04L 5/00* (2013.01); *H04L 5/0048* (2013.01); *H04L 5/0055* (2013.01); *H04W 56/00* (2013.01)

(58) Field of Classification Search
None
See application file for complete search history.

(56) References Cited

U.S. PATENT DOCUMENTS

| | | | |
|---|---|---|---|
| 2010/0195615 A1* | 8/2010 | Lee .................. | H04L 25/03343 370/330 |
| 2017/0289733 A1* | 10/2017 | Rajagopal ............... | H04W 4/70 |
| 2018/0324852 A1* | 11/2018 | Van Phan ............ | H04W 74/004 |
| 2019/0182834 A1* | 6/2019 | Lei ................... | H04W 72/0446 |
| 2020/0137738 A1* | 4/2020 | Liu ....................... | H04L 5/0064 |

* cited by examiner

*Primary Examiner* — Alex Skripnikov
*Assistant Examiner* — Richard Schnell
(74) *Attorney, Agent, or Firm* — Maschoff Brennan

(57) ABSTRACT

The disclosure discloses a method and device in user equipment and a base station for wireless communication. The user equipment transmits a first radio signal in a first air interface resource pool, then receives first control information, and transmits a second radio signal in a second air interface resource pool; the first control information is physical layer signaling, the second air interface resource pool is associated with the first air interface resource pool; the first control information comprises at least one of the first information and the second information; the timing advance of the second radio signal is related to the first information, a first transmission parameter set for transmitting the second radio signal is related to the second information; and the transmission of the second radio signal is grant-free.

16 Claims, 13 Drawing Sheets

METHOD AND DEVICE IN USER EQUIPMENT AND BASE STATION FOR WIRELESS COMMUNICATION

CROSS REFERENCE TO RELATED APPLICATION

This application claims the priority benefit of Chinese Patent Application Serial Number 201810152593.1, filed on Feb. 17, 2018, the full disclosure of which is incorporated herein by reference.

BACKGROUND

Technical Field

The disclosure relates to a transmitting method and device in a wireless communication system, and in particular to a method and device for grant-free uplink transmission.

Related Art

In the traditional 3rd Generation Partner Project (3GPP) Long-term Evolution (LTE) system, the uplink transmission on the terminal side is often based on grant of the base station, while in 5G New Radio Access Technology (NR) Phase 1, the terminal can perform grant-free uplink transmission in the air interface resources pre-configured by the base station to reduce the overhead of air interface signaling and improve the spectrum efficiency of the system.

In the future 5G NR Phase 2 and subsequent evolution phases, one base station will support a larger number of application scenarios than the number of existing system terminals. When the number of terminals is large, the grant-free uplink transmission will further demonstrate the advantages of small air interface signaling overhead and high spectrum efficiency. At the same time, in view of the adoption of a multi-antenna system with high carrier frequency and massive Multi-Input Multi-Output (MIMO), the grant-free transmitting method in the existing Phase 1 needs to be enhanced.

SUMMARY

In the traditional LTE system, the base station needs to transmit the timing advance to the user equipment before the user equipment performs data transmission based on the uplink grant to ensure that the uplink data of different user equipment can reach the base station at the same time, thereby avoiding interference between slots due to the near-far effect. At the same time, after the beamforming is introduced, the user equipment needs to perform the training of the uplink beam prior to the transmission to ensure that the user equipment uses the transmission parameter set that the base station can correctly receive for uplink transmission.

For the grant-free uplink transmission in the existing Phase 1, the base station allocates an air interface resource pool to the user equipment for the grant-free transmission. The user equipment then transmits the uplink data in the allocated air interface resource pool by itself.

The resource configuration in the above phase does not consider the impact of the TA and the spatial characteristics between the user equipment and the base station; when considering the impact of the TA, a simple implementation is to add enough Cyclic Prefix (CP) and Guard Time (GT) to each uplink transmitted data to ensure that there is no inter-slot interference; when considering the spatial characteristics, especially the directional characteristics of an analog beam, a simple solution is to acquire the spatial characteristics of the user for grant-free uplink transmission by configuring periodic reference signals when the base station configures air interface resources. However, for the grant-free transmission, especially when the number of terminals is large and the above terminals do not always need to perform uplink transmission, similar to applications such as smart meter reading in Internet of Things, the above method may add excessive redundancy in the data transmission and also occupy excessive air interface resources and signaling overhead, so that the performance gain resulted from the grant-free uplink transmission is greatly reduced.

In view of the above problem, the disclosure provides a solution. In the case of no conflict, the embodiments in the user equipment of the disclosure and the features in the embodiments may be applied to base station, and vice versa. In the case of no conflict, the embodiments of the disclosure and the features in the embodiments may be combined with each other arbitrarily.

The disclosure discloses a method in user equipment for wireless communication, comprising:

transmitting a first radio signal in a first air interface resource pool;

receiving first control information; and transmitting a second radio signal in a second air interface resource pool;

wherein the first control information is physical layer signaling, the second air interface resource pool is associated with the first air interface resource pool; the first control information comprises at least one of the first information and the second information; the timing advance of the second radio signal is related to the first information, a first transmission parameter set for transmitting the second radio signal is related to the second information; and the transmission of the second radio signal is grant-free.

In one embodiment, the above method has the advantage that: the base station acquires the beamforming feature and the TA information for the user equipment by using the first radio signal transmitted by the user equipment, and feeds the above information to the user equipment by using the first control information, thereby helping the user equipment to transmit a grant-free data channel, i.e., the second radio signal, more efficiently.

In one embodiment, the above method has the advantage that: the first control information is a physical layer channel, and the base station can quickly and timely feed the first information and the second information back by using the first control information, thereby helping the user equipment to dynamically adjust an uplink transmission beam and the TA to further improve the performance of the uplink transmission, and avoiding adding GT to the data to further improve the spectral efficiency.

According to an aspect of the disclosure, the above method is characterized by comprising:

receiving second control information;

wherein the second control information comprises Q second type domains, and the Q second type domains correspond to Q first-type air interface resource pools, respectively; the first control information comprises Q1 first type domain(s), the Q1 first type domain(s) corresponds (correspond) to Q1 first-type air interface resource pool(s), respectively, and the first air interface resource pool is a first-type air interface resource pool in the Q1 first-type air interface resource pool(s); the Q1 first-type air interface resource pool(s) is(are) a subset of the Q first-type air interface resource pools; the Q is a positive integer not less than the Q1; the Q1 is a positive integer; the second control information is used for at least one of:

indicating a first type domain corresponding to the first air interface resource pool in the Q1 first type domain(s); and indicating the Q1 first-type air interface resource pool(s) from the Q first-type air interface resource pools.

In one embodiment, the method has the advantage that: the base station controls the number of bits occupied by the first control information by selecting the size of the value of Q1, thereby effectively reducing the overhead of the control signaling and improving the spectrum efficiency.

According to an aspect of the disclosure, the above method is characterized by comprising:

receiving third control information in the third air interface resource pool;

wherein the third control information comprises Q1 third type domain(s), and the Q1 third type domain(s) is(are) used to indicate whether the radio signals in the Q1 first-type air interface resource pool(s) is(are) correctly decoded, respectively.

In one embodiment, the method has the advantage that: the number of bits of the control signaling corresponding to the downlink Hybrid Automatic Repeat Request-Acknowledgement (HARQ-ACK) of the second radio signal is also related to the value of Q1, further reducing the number of bits occupied by the downlink HARQ-ACK of the grant-free uplink transmission, and avoiding reserving HARQ-ACK resources for each of the Q first-type air interface resource pools.

According to an aspect of the disclosure, the method is characterized in that a target first type domain is a first type domain corresponding to the first air interface resource pool in the Q1 first type domain(s), and the number of bits included in the target first type domain is related to the Q1.

In one embodiment, the above method has the advantage that: when the number of bits included in the first control information is constant, the smaller the value of Q1, the more the number of bits allocated to the target first type domain, and thus the higher the accuracy of the first information and the second information; the larger the value of Q1, the fewer the number of bits allocated to the target first type domain, and thus the lower the accuracy of the first information and the second information; the above mechanism can flexibly adjust the accuracy of the first information and the second information, which in turn increases the flexibility of the system.

According to an aspect of the disclosure, the above method is characterized by comprising:

receiving M1 downlink reference signals;

wherein a downlink target reference signal is one of the M1 downlink reference signals, and the second information is used to indicate the downlink target reference signal from the M1 downlink reference signals; the first receiving parameter set is used to receive the downlink target reference signal, and the first receiving parameter set is related to the first transmission parameter set; and the M1 is a positive integer greater than 1.

In one embodiment, the above method has the advantage that: the downlink receiving beam of the user equipment is associated with the uplink transmitting beam, thereby ensuring that the uplink transmitting beam used by the user equipment when transmitting the second radio signal can be received by the base station using a correct receiving beam.

In one embodiment, the above method has another advantage that when the M1 downlink reference signals correspond to M1 Synchronization Signal Blocks (SSBs), respectively, the user equipment can complete the above operations in the process of synchronization, without adding extra implementation complexity.

According to an aspect of the disclosure, the method is characterized in that the first radio signal comprises K1 first radio sub-signals, and the K1 first radio sub-signals are transmitted in K1 multi-carrier symbol groups, respectively; a target radio sub-signal is a first radio sub-signal in the K1 first radio sub-signals, the second information is used to indicate the target radio sub-signal from the K1 first radio sub-signals, a second transmission parameter set is used to transmit the target radio sub-signal, and the second transmission parameter set is related to the first transmission parameter set.

In one embodiment, the above method has the advantage that: the user equipment transmits the K1 first radio sub-signals in a repeated or sweeping manner to help the base station to determine a receiving beam for the first radio signal, thereby ensuring that the base station uses a correct receiving beamforming vector to receive the second radio signal.

The disclosure discloses a method in a base station for wireless communication, comprising:

receiving a first radio signal in a first air interface resource pool;

transmitting first control information; and receiving a second radio signal in a second air interface resource pool;

wherein the first control information is physical layer signaling, the second air interface resource pool is associated with the first air interface resource pool; the first control information comprises at least one of the first information and the second information; the timing advance of the second radio signal is related to the first information, a first transmission parameter set for transmitting the second radio signal is related to the second information; and the transmission of the second radio signal is grant-free.

According to an aspect of the disclosure, the above method is characterized by comprising:

transmitting second control information;

wherein the second control information comprises Q second type domains, and the Q second type domains correspond to Q first-type air interface resource pools, respectively; the first control information comprises Q1 first type domain(s), the Q1 first type domain(s) corresponds (correspond) to Q1 first-type air interface resource pool(s), respectively, and the first air interface resource pool is a first-type air interface resource pool in the Q1 first-type air interface resource pool(s); the Q1 first-type air interface resource pool(s) is(are) a subset of the Q first-type air interface resource pools; the Q is a positive integer not less than the Q1; the Q1 is a positive integer; the second control information is used for at least one of:

indicating a first type domain corresponding to the first air interface resource pool in the Q1 first type domain(s); and indicating the Q1 first-type air interface resource pool(s) from the Q first-type air interface resource pools.

According to an aspect of the disclosure, the above method is characterized by comprising:

transmitting third control information in the third air interface resource pool;

wherein the third control information comprises Q1 third type domain(s), and the Q1 third type domain(s) is(are) used to indicate whether the radio signals in the Q1 first-type air interface resource pool(s) is(are) correctly decoded, respectively.

According to an aspect of the disclosure, the method is characterized in that: a target first type domain is a first type domain corresponding to the first air interface resource pool in the Q1 first type domain(s), and the number of bits included in the target first type domain is related to the Q1.

According to an aspect of the disclosure, the above method is characterized by comprising:

transmitting M1 downlink reference signals;

wherein a downlink target reference signal is one of the M1 downlink reference signals, and the second information is used to indicate the downlink target reference signal from the M1 downlink reference signals; the first receiving parameter set is used to receive the downlink target reference signal, and the first receiving parameter set is related to the first transmission parameter set; and the M1 is a positive integer greater than 1.

According to an aspect of the disclosure, the method is characterized in that the first radio signal comprises K1 first radio sub-signals, and the K1 first radio sub-signals are transmitted in K1 multi-carrier symbol groups, respectively; a target radio sub-signal is a first radio sub-signal in the K1 first radio sub-signals, the second information is used to indicate the target radio sub-signal from the K1 first radio sub-signals, a second transmission parameter set is used to transmit the target radio sub-signal, and the second transmission parameter set is related to the first transmission parameter set.

The disclosure discloses user equipment for wireless communication, comprising:

a first transceiver configured to transmit a first radio signal in a first air interface resource pool;

a first receiver configured to receive first control information; and a second transceiver configured to transmit a second radio signal in a second air interface resource pool;

wherein the first control information is physical layer signaling, the second air interface resource pool is associated with the first air interface resource pool; the first control information comprises at least one of the first information and the second information; the timing advance of the second radio signal is related to the first information, a first transmission parameter set for transmitting the second radio signal is related to the second information; and the transmission of the second radio signal is grant-free.

In one embodiment, the above user equipment for wireless communication is characterized in that the first receiver further receives second control information; the second control information comprises Q second type domains, and the Q second type domains correspond to Q first-type air interface resource pools, respectively; the first control information comprises Q1 first type domain(s), the Q1 first type domain(s) corresponds(correspond) to Q1 first-type air interface resource pool(s), respectively, and the first air interface resource pool is a first-type air interface resource pool in the Q1 first-type air interface resource pool(s); the Q1 first-type air interface resource pool(s) is(are) a subset of the Q first-type air interface resource pools; the Q is a positive integer not less than the Q1; the Q1 is a positive integer; the second control information is used for at least one of:

indicating a first type domain corresponding to the first air interface resource pool in the Q1 first type domain(s); and indicating the Q1 first-type air interface resource pool(s) from the Q first-type air interface resource pools.

In one embodiment, the above user equipment for wireless communication is characterized in that the second transceiver further receives third control information in the third air interface resource pool; the third control information comprises Q1 third type domain(s), and the Q1 third type domain(s) is(are) used to indicate whether the radio signals in the Q1 first-type air interface resource pool(s) is(are) correctly decoded, respectively.

In one embodiment, the above user equipment for wireless communication is characterized in that: a target first type domain is a first type domain corresponding to the first air interface resource pool in the Q1 first type domain(s), and the number of bits included in the target first type domain is related to the Q1.

In one embodiment, the above user equipment for wireless communication is characterized in that: the first transceiver further receives M1 downlink reference signals; a downlink target reference signal is one of the M1 downlink reference signals, and the second information is used to indicate the downlink target reference signal from the M1 downlink reference signals; the first receiving parameter set is used to receive the downlink target reference signal, and the first receiving parameter set is related to the first transmission parameter set; and the M1 is a positive integer greater than 1.

In one embodiment, the above user equipment for wireless communication is characterized in that the first radio signal comprises K1 first radio sub-signals, and the K1 first radio sub-signals are transmitted in K1 multi-carrier symbol groups, respectively; a target radio sub-signal is a first radio sub-signal in the K1 first radio sub-signals, the second information is used to indicate the target radio sub-signal from the K1 first radio sub-signals, a second transmission parameter set is used to transmit the target radio sub-signal, and the second transmission parameter set is related to the first transmission parameter set.

The disclosure discloses a base station for wireless communication, comprising:

a third transceiver configured to receive a first radio signal in a first air interface resource pool;

a first transmitter configured to transmit first control information; and a fourth transceiver configured to receive a second radio signal in a second air interface resource pool;

wherein the first control information is physical layer signaling, the second air interface resource pool is associated with the first air interface resource pool; the first control information comprises at least one of the first information and the second information; the timing advance of the second radio signal is related to the first information, a first transmission parameter set for transmitting the second radio signal is related to the second information; and the transmission of the second radio signal is grant-free.

In one embodiment, the base station device for wireless communication is characterized in that the first transmitter further transmits second control information; the second control information comprises Q second type domains, and the Q second type domains correspond to Q first-type air interface resource pools, respectively; the first control information comprises Q1 first type domain(s), the Q1 first type domain(s) corresponds(correspond) to Q1 first-type air interface resource pool(s), respectively, and the first air interface resource pool is a first-type air interface resource pool in the Q1 first-type air interface resource pool(s); the Q1 first-type air interface resource pool(s) is(are) a subset of the Q first-type air interface resource pools; the Q is a positive integer not less than the Q1; the Q1 is a positive integer; the second control information is used for at least one of:

indicating a first type domain corresponding to the first air interface resource pool in the Q1 first type domain(s); and indicating the Q1 first-type air interface resource pool(s) from the Q first-type air interface resource pools.

In one embodiment, the above base station for wireless communication is characterized in that the fourth transceiver further transmits third control information in the third air interface resource pool; the third control information comprises Q1 third type domain(s), and the Q1 third type domain(s) is(are) used to indicate whether the radio signals in the Q1 first-type air interface resource pool(s) is(are) correctly decoded, respectively.

In one embodiment, the base station for wireless communication is characterized in that a target first type domain is a first type domain corresponding to the first air interface resource pool in the Q1 first type domain(s), and the number of bits included in the target first type domain is related to the Q1.

In one embodiment, the base station for wireless communication is characterized in that the third transceiver further transmits M1 downlink reference signals; a downlink target reference signal is one of the M1 downlink reference signals, and the second information is used to indicate the downlink target reference signal from the M1 downlink reference signals; the first receiving parameter set is used to receive the downlink target reference signal, and the first receiving parameter set is related to the first transmission parameter set; and the M1 is a positive integer greater than 1.

In one embodiment, the base station for wireless communication is characterized in that the first radio signal comprises K1 first radio sub-signals, and the K1 first radio sub-signals are transmitted in K1 multi-carrier symbol groups, respectively; a target radio sub-signal is a first radio sub-signal in the K1 first radio sub-signals, the second information is used to indicate the target radio sub-signal from the K1 first radio sub-signals, a second transmission parameter set is used to transmit the target radio sub-signal, and the second transmission parameter set is related to the first transmission parameter set.

In one embodiment, the disclosure has the following advantages compared with the conventional solution.

The base station acquires the beamforming feature and the TA information for the user equipment by using the first radio signal transmitted by the user equipment, and feeds the above information to the user equipment by using the first control information, thereby helping the user equipment to transmit a grant-free data channel, i.e., the second radio signal, more efficiently.

The first control information is a physical layer channel, and the base station can quickly and timely feed the first information and the second information back by using the first control information, thereby helping the user equipment to dynamically adjust an uplink transmission beam and the TA to further improve the performance of the uplink transmission, and avoiding adding GT to the data to further improve the spectral efficiency.

The base station controls the number of bits occupied by the first control information by selecting the size of Q1, thereby effectively reducing the overhead of the control signaling and improving the spectrum efficiency.

The number of bits of the control signaling corresponding to the downlink HARQ-ACK of the second radio signal is also related to the value of Q1, further reducing the number of bits occupied by the downlink HARQ-ACK of the grant-free uplink transmission, and avoiding reserving HARQ-ACK resources for each of the Q first-type air interface resource pools.

When the number of bits included in the first control information is constant, the smaller the value of Q1, the more the number of bits allocated to the target first type domain, and thus the higher the accuracy of the first information and the second information; the larger the value of Q1, the fewer the number of bits allocated to the target first type domain, and thus the lower the accuracy of the first information and the second information; the above mechanism can flexibly adjust the accuracy of the first information and the second information, which in turn increases the flexibility of the system.

The downlink receiving beam of the user equipment is associated with the uplink transmitting beam, thereby ensuring that the uplink transmitting beam used by the user equipment when transmitting the second radio signal can be received by the base station using a correct receiving beam.

When the M1 downlink reference signals correspond to M1 SSBs, respectively, the user equipment can complete the above operations in the process of synchronization, without adding extra implementation complexity.

The user equipment transmits the K1 first radio sub-signals in a repeated or sweeping manner to help the base station to determine a receiving beam for the first radio signal, thereby ensuring that the base station uses a correct receiving beamforming vector to receive the second radio signal.

BRIEF DESCRIPTION OF THE DRAWINGS

Other features, objects and advantages of the disclosure will become more apparent from the detailed description of non-restrictive embodiments taken in conjunction with the following drawings.

DESCRIPTION OF THE EMBODIMENTS

The technical schemes of the present disclosure will be further described in detail below with reference to the accompanying drawings. It should be noted that the embodiments of the disclosure and the features in the embodiments may be combined with each other without conflict.

Embodiment 1

Figure 1:
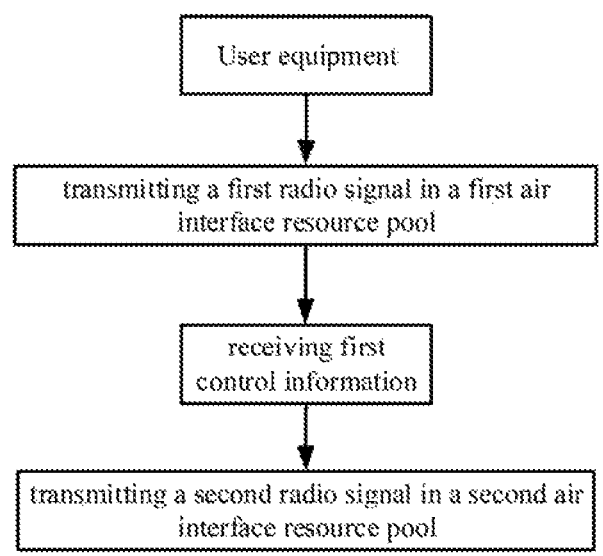
FIG. 1 is a flow diagram illustrating a first radio signal according to one embodiment of the disclosure.

Embodiment 1 illustrates a flow diagram of a first radio signal, as shown in FIG. 1.

In Embodiment 1, in the disclosure, the user equipment first transmits a first radio signal in a first air interface resource pool; receives first control information; and then transmits a second radio signal in a second air interface resource pool; the first control information is physical layer signaling, the second air interface resource pool is associated with the first air interface resource pool; the first control information comprises at least one of the first information and the second information; the timing advance of the second radio signal is related to the first information, a first transmission parameter set for transmitting the second radio signal is related to the second information; and the transmission of the second radio signal is grant-free.

In one sub-embodiment, the air interface resource occupied by the first radio signal is used to indicate the air interface resource occupied by the second radio signal.

In one sub-embodiment, the air interface resource occupied by the first radio signal implicitly indicates the air interface resource occupied by the second radio signal.

In one sub-embodiment, the timing advance of the second radio signal is related to the first information, meaning that the first information is used to indicate the timing advance of the second radio signal.

In one sub-embodiment, the unit of timing advance is milliseconds.

In one sub-embodiment, the unit of timing advance is microseconds.

In one sub-embodiment, the unit of timing advance is the duration of the multi-carrier symbol in the time domain.

In one sub-embodiment, the timing advance means that: the sender of the first control signaling is a first base station, the user equipment obtains the start time of the downlink time slot for the first base station by using the SSB transmitted by the first base station, and the timing advance is a negative offset of the start time of the uplink time slot occupied by the second radio signal and the start time of the downlink time slot.

In one sub-embodiment, the first information comprises a given index, the given index is used to indicate a given candidate time value from T1 candidate time values, and the given candidate time value is used for the timing advance of the second radio signal.

In one subsidiary embodiment of this sub-embodiment, the unit of the given candidate time value is milliseconds.

In one subsidiary embodiment of this sub-embodiment, the unit of the given candidate time value is microseconds.

In one subsidiary embodiment of this sub-embodiment, the given candidate time value is the duration of a positive integer number of multi-carrier symbols.

In one sub-embodiment, the transmission of the second radio signal is grant-free, meaning that the transmission of the first radio signal does not have scheduling of uplink grant signaling.

In one sub-embodiment, the transmission of the second radio signal is grant-free, meaning that the transmission of the first radio signal is contention-based.

In one sub-embodiment, the user equipment considers that the uplink radio signal can be directly transmitted in the second air interface resource pool without scheduling by the base station.

In one sub-embodiment, the multi-carrier symbol in the disclosure is one of an Orthogonal Frequency Division Multiplexing (OFDM) symbol, a Single-Carrier Frequency Division Multiple Access (SC-FDMA) symbol, a Filter Bank Multi Carrier (FBMC) symbol, an OFDM symbol containing a Cyclic Prefix (CP), and a Discrete Fourier Transform Spreading Orthogonal Frequency Division Multiplexing (DFT-s-OFDM) symbol containing a CP.

In one sub-embodiment, the first transmission parameter set for transmitting the second radio signal is related to the second information, meaning that the second information is used to indicate a downlink target reference signal; the downlink target reference signal is used to determine the first transmission parameter set used to transmit the second radio signal.

In one subsidiary embodiment of this sub-embodiment, the downlink target reference signal corresponds to a given downlink antenna port group, the first transmission parameter set corresponds to a first antenna port group, and the given downlink antenna port group and the first antenna port group are Quasi Co-located (QCL).

In one sub-embodiment, the first transmission parameter set for transmitting the second radio signal is related to the second information, meaning that the second information is used to indicate the first transmission parameter set.

In one sub-embodiment, the two antenna port groups described in the disclosure are QCL, meaning that: all or part of a large-scale properties of a radio signal transmitted on any one antenna port in one antenna port group of the two antenna port groups can be inferred from all or part of a large-scale properties of a radio signal transmitted on any one antenna port in the other antenna port group, and the large-scale properties comprises multi-antenna-related large-scale properties and multi-antenna-unrelated large-scale properties.

In one sub-embodiment, the multi-antenna-related large-scale properties of the radio signal in the disclosure comprise: one or more of an angle of arrival, an angle of departure, spatial correlation, spatial Tx parameters, and spatial Rx parameters.

In one sub-embodiment, the multi-antenna-related large-scale properties of the radio signal in the disclosure comprise: one or more of delay spread, Doppler spread, Doppler shift, path loss, average gain, and average delay.

In one sub-embodiment, the first transmission parameter set for transmitting the second radio signal is related to the second information, meaning that the second information is used to indicate the first transmission parameter set.

In one sub-embodiment, the first transmission parameter set comprises: one or more of a transmitting antenna port, a transmitting antenna port group, a transmitting beam, a transmitting analog beamforming matrix, a transmitting analog beamforming vector, a transmitting beamforming vector, and transmitting spatial filtering.

In one sub-embodiment, the first control information belongs to a given Downlink Control Information (DCI), and the Cyclic Redundancy Check (CRC) included in the given DCI is scrambled by a given Radio Network Temporary Identifier (RNTI); the given RNTI is common to the cell, or the given RNTI is specific to the terminal group and the user equipment belongs to the terminal group.

In one sub-embodiment, the first control information is common to the cell; or the first signaling is common to the terminal group, the terminal group comprises a positive integer number of terminals, and the user equipment is one terminal in the terminal group.

In one sub-embodiment, any one of the antenna port groups in the disclosure comprises P antenna ports, the P is a positive integer greater than 1, or the P is equal to 1.

In one sub-embodiment, the first air interface resource pool comprises a positive integer number of subcarriers in the frequency domain and an integer number of multi-carrier symbols in the time domain.

In one sub-embodiment, the first air interface resource pool comprises a positive integer number of Resource Elements (REs).

In one sub-embodiment, the second air interface resource pool comprises a positive integer number of subcarriers in the frequency domain and an integer number of multi-carrier symbols in the time domain.

In one sub-embodiment, the second air interface resource pool comprises a positive integer number of REs.

In one sub-embodiment, the first radio signal is used to indicate a first identifier, and the user equipment uses the first identifier.

In one sub-embodiment, the first radio signal comprises a preamble for the user equipment.

In one sub-embodiment, the physical layer channel corresponding to the first radio signal is a Physical Random Access Channel (PRACH).

In one sub-embodiment, the physical layer channel corresponding to the second radio signal is a Physical Uplink Shared Channel (PUSCH).

In one sub-embodiment, the transmission channel corresponding to the second radio signal is an Uplink Shared Channel (UL-SCH).

In one sub-embodiment, the user equipment is the idle user equipment of Radio Resource Control (RRC).

In one sub-embodiment, the user equipment is the inactive user equipment of RRC.

Embodiment 2

Figure 2:
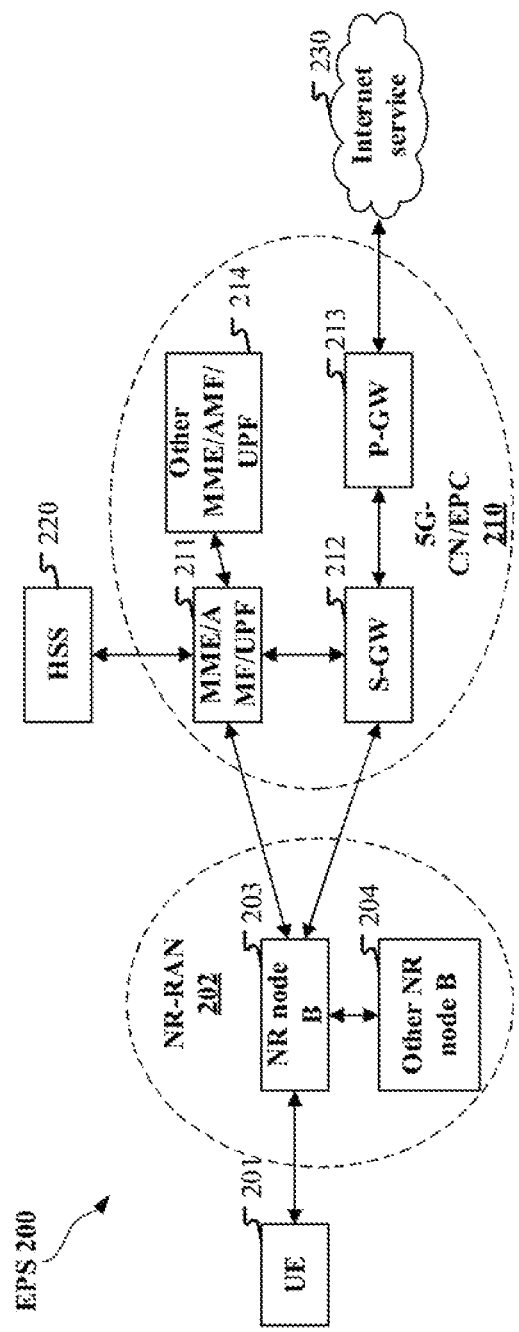
FIG. 2 is a schematic diagram illustrating a network architecture according to one embodiment of the disclosure.

Embodiment 2 illustrates a schematic diagram of a network architecture, as shown in FIG. 2.

Embodiment 2 illustrates a schematic diagram of a network architecture according to the present disclosure, as shown in FIG. 2. FIG. 2 illustrates a diagram of a system network architecture 200 of NR 5G, Long-Term Evolution (LTE), and Long-Term Evolution Advanced (LTE-A). The NR 5G or LTE network architecture 200 may be referred to as an Evolved Packet System (EPS) 200 or other appropriate terms. The EPS 200 may include one or more of User Equipment (UE) 201, a Next Generation Radio Access Network (NG-RAN) 202, a 5G-Core Network (5G-CN)/Evolved Packet Core (EPC) 210, a Home Subscriber Server (HSS) 220 and an Internet Service 230. The EPS may be interconnected with other access networks. For simple description, the entities/interfaces are not shown. As shown in the figure, the EPS provides packet switching services. Those skilled in the art are easy to understand that various concepts presented throughout the present disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a Transmitter Receiver Point (TRP) or other appropriate terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistants (PDAs), Satellite Radios, non-terrestrial base station communication, satellite mobile communication, Global Positioning Systems, multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or other appropriate terms. The gNB 203 is connected to the 5G-CN/EPC 210 via an S1/NG interface. The 5G-CN/EPC 210 includes an MME/AMF/UPF 211, other Mobility Management Entity (MME)/Authentication Management Field (AMF)/User Plane Function (UPF) 214, a Service Gateway (S-GW) 212 and a Packet Data Network Gateway (P-GW) 213. The MME/AMF/UPF 211 is a control node for processing a signaling between the UE 201 and the 5G-CN/EPC 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including Internet, Intranet, IP Multimedia Subsystems (IP IMSs) and Packet Switching Streaming Services (PSSs).

In one sub-embodiment, the UE 201 corresponds to the user equipment in the disclosure.

In one sub-embodiment, the gNB 203 corresponds to the base station in the disclosure.

In one sub-embodiment, the UE 201 supports wireless communication for data transmission over an unauthorized spectrum.

In one sub-embodiment, the gNB 203 supports wireless communication for data transmission over an unauthorized spectrum.

In one sub-embodiment, the UE 201 supports Non-Orthogonal Multiple Access (NOMA)-based wireless communication.

In one sub-embodiment, the gNB 203 supports NOMA-based wireless communication.

In one sub-embodiment, the UE 201 supports Grant-Free uplink transmission.

In one sub-embodiment, the gNB 203 supports Grant-Free uplink transmission.

In one sub-embodiment, the UE 201 supports contention-based uplink transmission.

In one sub-embodiment, the gNB 203 supports contention-based uplink transmission.

In one sub-embodiment, the UE 201 supports beamforming-based uplink transmission.

In one sub-embodiment, the gNB 203 supports beamforming-based uplink transmission.

In one sub-embodiment, the UE 201 supports Massive-MIMO-based uplink transmission.

In one sub-embodiment, the gNB 203 supports Massive-MIMO-based uplink transmission.

Embodiment 3

Figure 3:
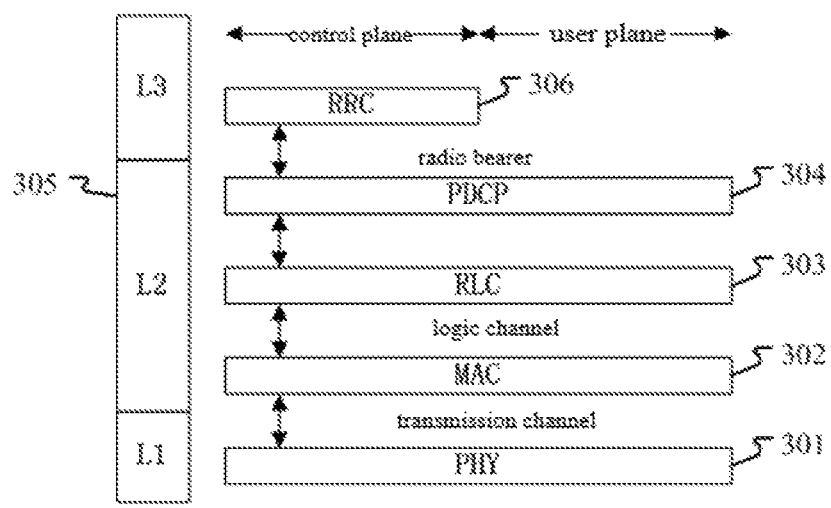
FIG. 3 is a schematic diagram illustrating a radio protocol architecture of a user plane and a control plane according to one embodiment of the disclosure.

Embodiment 3 illustrates a schematic diagram of a radio protocol architecture of a user plane and a control plane according to the present disclosure, as shown in FIG. 3.

FIG. 3 illustrates a schematic diagram of a radio protocol architecture of a user plane and a control plane. In FIG. 3, the radio protocol architecture of user equipment (UE) and Base Station (gNB or eNB) is represented by three layers, which are a layer 1, a layer 2 and a layer 3 respectively. The layer 1 (L1) 301 is the lowest layer and performs signal processing functions of each PHY layer. The layer 1 is called PHY 301 in this paper. The layer 2 (L2) 305 is above the PHY 301, and is in charge of the link between the UE and the gNB via the PHY 301. In the user plane, the L2 305 includes a Medium Access Control (MAC) sublayer 302, a Radio Link Control (RLC) sublayer 303, and a Packet Data Convergence Protocol (PDCP) sublayer 304. All the three sublayers terminate at the gNB of the network side. Although not described in FIG. 3, the UE may include several higher-layers above the L2 305, such as a network layer (i.e. IP layer) terminated at a P-GW of the network side and an application layer terminated at the other side of the connection (i.e. a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a lost packet to as to compensate the disordered receiving caused by Hybrid Automatic Repeat Request (HARQ). The MAC sublayer 302 provides multiplexing between logical channels and transmission channels. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression function for the control plane. The control plane also includes a Radio Resource Control (RRC) sublayer 306 in the layer 3 (L3). The RRC sublayer 306 is responsible for acquiring radio resources (i.e. radio bearer) and configuring the lower layers using an RRC signaling between the gNB and the UE.

In one sub-embodiment, the radio protocol architecture in FIG. 3 is applicable to the UE in the present disclosure.

In one sub-embodiment, the radio protocol architecture in FIG. 3 is applicable to the base station equipment in the present disclosure.

In one sub-embodiment, the first radio signal in the present disclosure is generated by the PHY 301.

In one sub-embodiment, the second radio signal in the present disclosure is generated by the PHY 301.

In one sub-embodiment, the second radio signal in the present disclosure is generated by the MAC 302.

In one sub-embodiment, the first control information in the present disclosure is generated by the PHY 301.

In one sub-embodiment, the second control information in the disclosure is generated by the PHY 301.

In one sub-embodiment, the third control information in the disclosure is generated by the PHY 301.

In one sub-embodiment, the M1 downlink reference signals in the disclosure are generated by the PHY 301.

Embodiment 4

Figure 4:
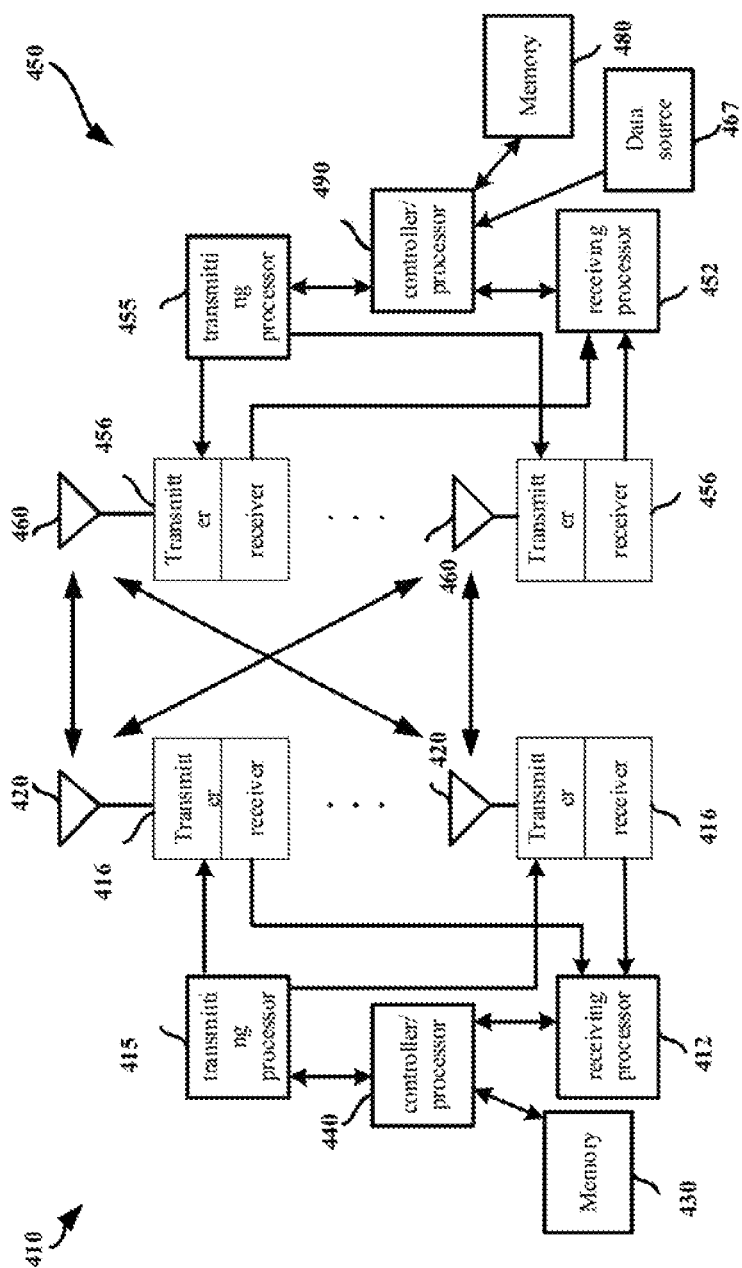
FIG. 4 is a schematic diagram illustrating an evolved node and a UE according to one embodiment of the disclosure.

Embodiment 4 shows a schematic diagram of a base station and user equipment according to the present disclosure, as shown in FIG. 4. FIG. 4 is a block diagram of a gNB 410 in communication with UE 450 in an access network.

The base station (410) may include a controller/processor 440, a memory 430, a receiving processor 412, a transmitting processor 415, a transmitter/receiver 416 and an antenna 420.

The user equipment (450) may include a controller/processor 490, a memory 480, a data source 467, a transmitting processor 455, a receiving processor 452, a transmitter/receiver 456, and an antenna 460.

In Uplink (UL) transmission, the processing related to the base station (410) comprises:

a receiver 416, which is configured to receive a radio frequency signal through its corresponding antenna 420, convert the received radio frequency signal into a baseband signal and provide the baseband signal to the receiving processor 412;

a receiving processor 412, which is configured to implement various signal reception processing functions for the L1 layer (i.e., the physical layer) including decoding, deinterleaving, descrambling, demodulating, and physical layer control signaling extraction, etc.;

a controller/processor 440, which is configured to implement L2 layer functions and is associated with a memory 430 in which program codes and data are stored;

the controller/processor 440, which is configured to provide demultiplexing between the transport and logical channels, packet reassembly, decryption, header decompression, and control signal processing to recover upper layer packets from UE 450; the upper layer packets from the controller/processor 440 can be provided to the core network;

the controller/processor 440, which is configured to determine to receive the first radio signal in the first air interface resource pool, and determine to receive the second radio signal in the second air interface resource pool and transmit the result to the receiving processor 412.

In UL transmission, the processing related to the user equipment (450) comprises:

a data source 467, which is configured to provide the upper layer packet to a controller/processor 490, wherein the data source 467 represents all protocol layers above the L2 layer;

a transmitter 456, which is configured to transmit a radio frequency signal through its corresponding antenna 460, convert the baseband signal into a radio frequency signal, and provide the radio frequency signal to the corresponding antenna 460;

a transmitting processor 455, which is configured to implement various signal reception processing functions for the L1 layer (i.e., the physical layer) including decoding, deinterleaving, descrambling, demodulating, and physical layer control signaling extraction, etc.;

a controller/processor 490, which is configured to implement header compression, encryption, packet segmentation and reordering, and multiplexing between logical and transmission channels based on radio resource allocation of gNB 410 for implementing the L2 layer function for the user plane and the control plane;

the controller/processor 490, which is also responsible for HARQ operations, retransmission of lost packets, and signaling to the gNB 410;

the controller/processor 490, which is configured to determine to transmit the first radio signal in the first air interface resource pool, and determine to transmit the second radio signal in the second air interface resource pool and transmit the result to the transmitting processor 455.

In Downlink (DL) transmission, the processing related to the base station (410) comprises:

a controller/processor 440, wherein the upper layer packet arrives, the controller/processor 440 provides packet header compression, encryption, packet segmentation and reordering, and multiplexing and demultiplexing between the logical and transmission channels for implementing the L2 layer protocol for the user plane and the control plane; the upper-layer packet may include data or control information, such as a Downlink Shared Channel (DL-SCH);

the controller/processor 440, which is associated with a memory 430 in which program codes and data are stored, wherein the memory 430 may be a computer-readable medium;

the controller/processor 440 comprising a scheduling unit for transmitting a demand, wherein the scheduling unit is configured to schedule air interface resources corresponding to the transmission demand;

the controller/processor 440, which is configured to determine to transmit the first control information; and transmit the result to the transmitting processor 415;

the transmitting processor 415, which is configured to receive the bit stream output by the controller/processor 440, and implement various signal transmission processing functions for the L1 layer (i.e., the physical layer) including coding, interleaving, scrambling, modulating, power control/allocation, and generation of physics layer control signaling (including a PBCH, a PDCCH, a PHICH, a PCFICH, a reference signal), etc.;

the transmitter 416, which is configured to convert the baseband signals provided by the transmitting processor 415 into radio frequency signals and transmit the signals via the antenna 420; each transmitter 416 samples the respective input symbol streams to obtain respective sampled signal streams; each transmitter 416 performs further processing (such as digital to analog conversion, amplification, filtering, upconversion, etc.) on the respective sampling streams to obtain downlink signals.

In DL transmission, the processing related to the user equipment (450) may comprise:

a receiver 456, which is configured to convert the radio frequency signal received through the antenna 460 into a baseband signal and provide the baseband signal to the receiving processor 452;

a receiving processor 452, which is configured to implement various signal reception processing functions for the L1 layer (i.e., the physical layer) including decoding, deinterleaving, descrambling, demodulating, and physical layer control signaling extraction, etc.;

a controller/processor 490, which is configured to receive the bit stream output by the receiving processor 452, and provide packet header decompression, decryption, packet segmentation and reordering, and multiplexing and demultiplexing between the logical and transmission channels for implementing the L2 layer protocol for the user plane and the control plane;

the controller/processor 490, which is configured to determine to receive the first control information and transmit the result to the receiving processor 452;

the controller/processor 490, which is associated with a memory 480 in which program codes and data are stored, wherein the memory 480 may be a computer-readable medium;

In one sub-embodiment, the UE 450 device comprises: at least one processor and at least one memory, wherein the at least one memory includes a computer program code; the at least one memory and the computer program code are configured to be used together with the at least one processor. The UE 450 device at least: transmits a first radio signal in a first air interface resource pool, receives first control information, and transmits a second radio signal in a second air interface resource pool; wherein the first control information is physical layer signaling, the second air interface resource pool is associated with the first air interface resource pool; the first control information comprises at least one of the first information and the second information; the timing advance of the second radio signal is related to the first information, a first transmission parameter set for transmitting the second radio signal is related to the second information; and the transmission of the second radio signal is grant-free.

In one sub-embodiment, the UE 450 comprises: a memory in which a computer-readable instruction program is stored, wherein the computer-readable instruction program generates an action when executed by at least one processor. The action includes: transmitting a first radio signal in a first air interface resource pool, receiving first control information, and transmitting a second radio signal in a second air interface resource pool; wherein the first control information is physical layer signaling, the second air interface resource pool is associated with the first air interface resource pool; the first control information comprises at least one of the first information and the second information; the timing advance of the second radio signal is related to the first information, a first transmission parameter set for transmitting the second radio signal is related to the second information; and the transmission of the second radio signal is grant-free.

In one sub-embodiment, the gNB 410 device comprises: at least one processor and at least one memory, wherein the at least one memory includes a computer program code; the at least one memory and the computer program code are configured to be used together with the at least one processor. The gNB 410 device at least: receives a first radio signal in a first air interface resource pool, transmits first control information, and receives a second radio signal in a second air interface resource pool; wherein the first control information is physical layer signaling, the second air interface resource pool is associated with the first air interface resource pool; the first control information comprises at least one of the first information and the second information; the timing advance of the second radio signal is related to the first information, a first transmission parameter set for transmitting the second radio signal is related to the second information; and the transmission of the second radio signal is grant-free.

In one sub-embodiment, the gNB 410 comprises: a memory in which a computer-readable instruction program is stored, wherein the computer-readable instruction program generates an action when executed by at least one processor. The action includes: receiving a first radio signal in a first air interface resource pool, transmitting first control information, and receiving a second radio signal in a second air interface resource pool; wherein the first control information is physical layer signaling, the second air interface resource pool is associated with the first air interface resource pool; the first control information comprises at least one of the first information and the second information; the timing advance of the second radio signal is related to the first information, a first transmission parameter set for transmitting the second radio signal is related to the second information; and the transmission of the second radio signal is grant-free.

In one sub-embodiment, the UE 450 corresponds to the user equipment in the disclosure.

In one sub-embodiment, the gNB 410 corresponds to the base station in the disclosure.

In one sub-embodiment, the controller/processor 490 is configured to determine to transmit the first radio signal in the first air interface resource pool; determine to receive the first control information; and determine to transmit the second radio signal in the second air interface resource pool.

In one sub-embodiment, at least the first two of the transmitter 456, the transmitting processor 455, and the controller/processor 490 are configured to transmit the first radio signal in the first air interface resource pool.

In one sub-embodiment, at least the first two of the receiver 456, the receiving processor 452, and the controller/processor 490 are configured to receive the first control information.

In one sub-embodiment, at least the first two of the transmitter 456, the transmitting processor 455, and the controller/processor 490 are configured to transmit a second radio signal in the second air interface resource pool.

In one sub-embodiment, at least the first two of the receiver 456, the receiving processor 452, and the controller/processor 490 are configured to receive the second control information.

In one sub-embodiment, at least the first two of the receiver 456, the receiving processor 452, and the controller/processor 490 are configured to receive the third control information in the third air interface resource pool.

In one sub-embodiment, at least the first two of the receiver 456, the receiving processor 452, and the controller/processor 490 are configured to receive M1 downlink reference signals.

In one sub-embodiment, the controller/processor 440 is configured to determine to receive the first radio signal in the first air interface resource pool, determine to transmit the first control information, and determine to receive the second radio signal in the second air interface resource pool.

In one sub-embodiment, at least the first two of the receiver 416, the receiving processor 412, and the controller/processor 440 are configured to receive the first radio signal in the first air interface resource pool.

In one sub-embodiment, at least two of the transmitter 416, the transmitting processor 415, and the controller/processor 440 are configured to transmit the first control information.

In one sub-embodiment, at least the first two of the receiver 416, the receiving processor 412, and the controller/processor 440 are configured to receive the second radio signal in the second air interface resource pool.

In one sub-embodiment, at least two of the transmitter 416, the transmitting processor 415, and the controller/processor 440 are configured to transmit the second control information.

In one sub-embodiment, at least two of the transmitter 416, the transmitting processor 415, and the controller/processor 440 are configured to transmit the third control information in the third air interface resource pool.

In one sub-embodiment, at least two of the transmitter 416, the transmitting processor 415, and the controller/processor 440 are configured to transmit M1 downlink reference signals.

Embodiment 5

Figure 5:
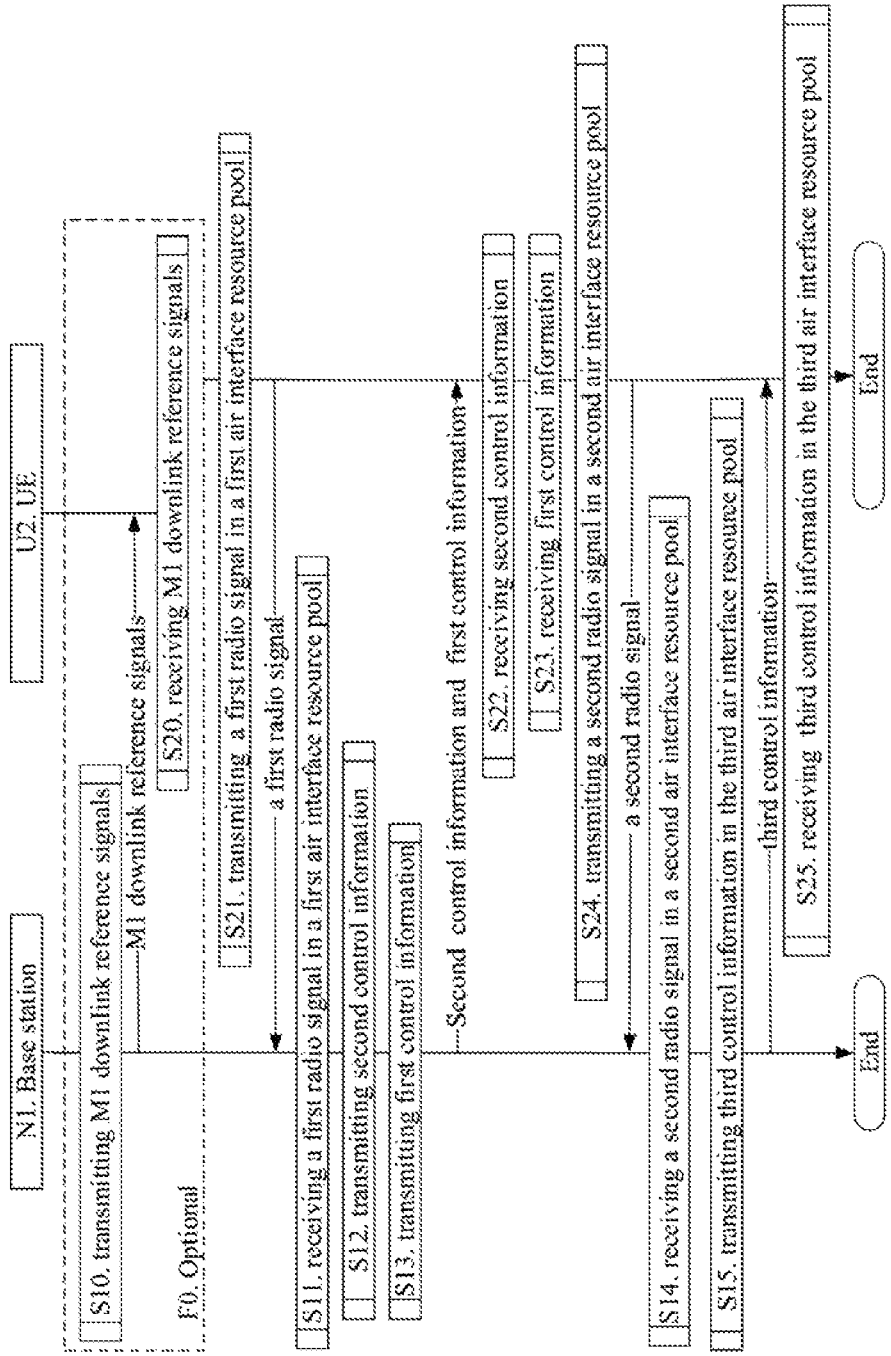
FIG. 5 is a flow diagram illustrating a second radio signal according to one embodiment of the disclosure.

Embodiment 5 illustrates a flow diagram of a second radio signal, as shown in FIG. 5. In FIG. 5, the base station N1 is a maintenance base station of a serving cell of user equipment U2. In the figure, the steps in the box identified as F0 are optional.

The base station N1 transmits M1 downlink reference signals in step S10; receives the first radio signal in the first air interface resource pool in step S11; transmits the second control information in step S12; transmits the first control information in step S13; receives a second radio signal in the second air interface resource pool in step S14; and transmits the third control information in the third air interface resource pool in step S15.

The user equipment U2 receives M1 downlink reference signals in step S20; transmits the first radio signal in the first air interface resource pool in step S21; receives the second control information in step S22; receives the first control information in step S23; transmits a second radio signal in the second air interface resource pool in step S24; and receives the third control information in the third air interface resource pool in step S25.

In Embodiment 5, the first control information is physical layer signaling, the second air interface resource pool is associated with the first air interface resource pool; the first control information comprises at least one of the first information and the second information; the timing advance of the second radio signal is related to the first information, a first transmission parameter set for transmitting the second radio signal is related to the second information; the second control information comprises Q second type domains, and the Q second type domains correspond to Q first-type air interface resource pools, respectively; the first control information comprises Q1 first type domain(s), the Q1 first type domain(s) corresponds(correspond) to Q1 first-type air interface resource pool(s), respectively, and the first air interface resource pool is a first-type air interface resource pool in the Q1 first-type air interface resource pool(s); the Q1 first-type air interface resource pool(s) is(are) a subset of the Q first-type air interface resource pools; the Q is a positive integer not less than the Q1; the Q1 is a positive integer; the transmission of the second radio signal is grant-free; the third control information comprises Q1 third type domain(s), and the Q1 third type domain(s) is(are) used to indicate whether the radio signals in the Q1 first-type air interface resource pool(s) is(are) correctly decoded, respectively; a downlink target reference signal is one of the M1 downlink reference signals, and the second information is used to indicate the downlink target reference signal from the M1 downlink reference signals; the first receiving parameter set is used to receive the downlink target reference signal, and the first receiving parameter set is related to the first transmission parameter set; the M1 is a positive integer greater than 1; and the second control information is used for at least one of:

indicating a first type domain corresponding to the first air interface resource pool in the Q1 first type domain(s); and indicating the Q1 first-type air interface resource pool(s) from the Q first-type air interface resource pools.

In one sub-embodiment, the Q1 is greater than 1.

In one sub-embodiment, the Q1 is 1.

In one sub-embodiment, any one of the Q second type domains is consisted of a positive integer number of bits.

In one sub-embodiment, any one of the Q1 first type domain(s) is consisted of a positive integer number of bits.

In one sub-embodiment, any two of the Q1 first type domain(s) comprise the same number of bits.

In one sub-embodiment, at least two of the Q1 first type domain(s) comprise different numbers of bits.

In one sub-embodiment, the second control information and the first control information belong to two different DCIs, respectively.

In one sub-embodiment, the second control information and the first control information belong to the same DCI.

In one sub-embodiment, any one of the Q second type domains is consisted of 1 bit, the Q second type domains correspond to Q bits, Q1 bit(s) Q1 bit(s) of the Q bits is(are) 1, the remaining bits are 0; and the Q1 bit(s) Q1 bit(s) corresponds(correspond) to the Q1 first-type air interface resource pool(s), respectively.

In one sub-embodiment, any one of the Q second type domains is consisted of 1 bit, the Q second type domains correspond to Q bits, Q1 bit(s) Q1 bit(s) of the Q bits is(are) 0, the remaining bits are 1; and the Q1 bit(s) Q1 bit(s) corresponds(correspond) to the Q1 first-type air interface resource pool(s), respectively.

In one sub-embodiment, any one of the Q second type domains is consisted of Z bits, and the Z is a positive integer greater than 1.

In one subsidiary embodiment of this sub-embodiment, the given second type domain is any one of the Q second type domains, the given second type domain corresponds to a given first-type air interface resource pool, the given first-type air interface resource pool comprises Z air interface resources, and the Z bits correspond to the Z air interface resources, respectively.

In one example of this subsidiary embodiment, the Z bits are used to indicate whether the radio signal transmitted on the Z air interface resources is correctly received by the base station N1, respectively.

In one sub-embodiment, the position of the bit, among the Q1 bit(s), corresponding to the first air interface resource pool in the Q1 bit(s) is used to indicate the position of the first type domain, among the Q1 first type domain(s), corresponding to the resource pool in the Q1 first type domain(s).

In one sub-embodiment, the Q1 bit(s) Q1 bit(s) corresponds(correspond) to the Q1 first type domain(s) one by one, respectively, the Q1 first type domain(s) corresponds (correspond) to the Q1 first-type air interface resource pool(s), respectively; the target bit is one bit of the Q1 bit(s), the target bit corresponds to the first air interface resource pool; the position of the target bit in the Q1 bit(s) is used to indicate a target first type domain from the Q1 first type domain(s), the target first type domain belongs to the Q1 first type domain(s); the target first type domain corresponds to the first air interface resource pool, and the target first type domain comprises the first information and the second information.

In one sub-embodiment, the Q1 first type domain(s) is(are) sequentially arranged according to the order of the Q1 bit(s) in the Q bits.

In one sub-embodiment, the first information in the first control information is related to the transmission of the second radio signal.

In one sub-embodiment, the second information in the first control information is related to the transmission of the second radio signal.

In one sub-embodiment, the second control information is unrelated to the transmission of the second radio signal.

In one sub-embodiment, the Q1 first-type air interface resource pool(s) occupies(occupy) the same time-frequency resource.

In one sub-embodiment, the Q first-type air interface resource pools occupy the same time-frequency resource.

In one sub-embodiment, the Q is fixed (i.e., requiring no signaling configuration).

In one sub-embodiment, the Q is configured through higher-layer signaling.

In one sub-embodiment, the number of bits occupied by the first control information is unrelated to the Q1.

In one sub-embodiment, the third control information belongs to a target DCI, the CRC included in the target DCI is scrambled by a given RNTI; the given RNTI is common to a cell, or the given RNTI is specific to a terminal group and the user equipment U2 belong to the terminal group.

In one sub-embodiment, the third air interface resource pool comprises a positive integer number of subcarriers in the frequency domain and an integer number of multi-carrier symbols in the time domain.

In one sub-embodiment, the target first type domain is a first type domain corresponding to the first air interface resource pool in the Q1 first type domain(s), and the number of bits included in the target first type domain is related to the Q1.

In one subsidiary embodiment of this sub-embodiment, the number of bits included in any one of the Q1 first type domain(s) is related to the Q1.

In one subsidiary embodiment of this sub-embodiment, the target first type domain comprises the first information.

In one subsidiary embodiment of this sub-embodiment, the target first type domain comprises the second information.

In one sub-embodiment, the number of bits occupied by the first control information is unrelated to the Q1.

In one sub-embodiment, any two of the Q1 first type domain(s) comprise the same number of bits.

In one sub-embodiment, the first receiving parameter set comprises: one or more of a receiving antenna port, a receiving antenna port group, a receiving beam, a receiving analog beamforming matrix, a receiving analog beamforming vector, a receiving beamforming vector, and receiving spatial filtering.

In one sub-embodiment, the first receiving parameter set is related to the first transmission parameter set, meaning that the receiving analog beamforming matrix corresponding to the first receiving parameter set is used as the transmitting analog beamforming matrix corresponding to the first transmission parameter set.

In one sub-embodiment, the first receiving parameter set is related to the first transmission parameter set, meaning that the receiving analog beam corresponding to the first receiving parameter set is used as the transmitting analog beam corresponding to the first transmission parameter set.

In one sub-embodiment, the first receiving parameter set is related to the first transmission parameter set, meaning that the receiving spatial filtering corresponding to the first receiving parameter set is used as the transmitting spatial filtering corresponding to the first transmission parameter set.

In one sub-embodiment, the first receiving parameter set is related to the first transmission parameter set, meaning that the spatial coverage of the receiving beam corresponding to the first receiving parameter set is within the spatial coverage of transmitting beam corresponding to the first transmission parameter set.

In one sub-embodiment, the M1 downlink reference signals correspond to M1 Channel State Information Reference Signals (CSI-RSs), respectively.

In one sub-embodiment, the M1 downlink reference signals correspond to M1 SSBs, respectively.

In one sub-embodiment, the M1 downlink reference signals use a sweeping transmission method.

In one sub-embodiment, the M1 downlink reference signals are transmitted using M1 first-type transmission parameter sets, respectively.

In one subsidiary embodiment of this sub-embodiment, any one of the M1 first-type transmission parameter sets comprises: one or more of a transmitting antenna port, a transmitting antenna port group, a transmitting beam, a transmitting analog beamforming matrix, a transmitting analog beamforming vector, a transmitting beamforming vector, and a transmitting spatial filtering.

In one sub-embodiment, the M1 downlink reference signals are transmitted using M1 downlink antenna port groups, respectively.

In one sub-embodiment, the first radio signal comprises K1 first radio sub-signals, and the K1 first radio sub-signals are transmitted in K1 multi-carrier symbol groups, respectively; a target radio sub-signal is a first radio sub-signal in the K1 first radio sub-signals, the second information is used to indicate the target radio sub-signal from the K1 first radio sub-signals, a second transmission parameter set is used to transmit the target radio sub-signal, and the second transmission parameter set is related to the first transmission parameter set.

In one subsidiary embodiment of this sub-embodiment, any one of the K1 multi-carrier symbol groups comprises L multi-carrier symbols, and the L is a positive integer.

In one example of this subsidiary embodiment, the L multi-carrier symbols are contiguous in the time domain.

In one example of this subsidiary embodiment, the L is equal to one.

In one subsidiary embodiment of this sub-embodiment, the second transmission parameter set comprises: one or more of a transmitting antenna port, a transmitting antenna port group, a transmitting beam, a transmitting analog beamforming matrix, a transmitting analog beamforming vector, a transmitting beamforming vector, and a transmitting spatial filtering.

In one subsidiary embodiment of this sub-embodiment, the second transmission parameter set is related to the first transmission parameter set, meaning that the transmitting analog beamforming matrix corresponding to the first transmission parameter set is used as the transmitting analog beamforming matrix corresponding to the second transmission parameter set.

In one subsidiary embodiment of this sub-embodiment, the second transmission parameter set is related to the first transmission parameter set, meaning that the transmitting analog beam corresponding to the second transmission parameter set is used as the transmitting analog beam corresponding to the first transmission parameter set.

In one subsidiary embodiment of this sub-embodiment, the second transmission parameter set is related to the first transmission parameter set, meaning that the transmitting spatial filtering corresponding to the second transmission parameter set is used as the transmitting spatial filtering corresponding to the first transmission parameter set.

In one subsidiary embodiment of this sub-embodiment, the second transmission parameter set is related to the first transmission parameter set, meaning that the second transmission parameter set and the first transmission parameter set are QCL.

In one subsidiary embodiment of this sub-embodiment, the second transmission parameter set is related to the first transmission parameter set, meaning that the second radio signal and the target radio sub-signal are transmitted using the same antenna port group.

In one subsidiary embodiment of this sub-embodiment, the second transmission parameter set is related to the first transmission parameter set, meaning that both the second transmission parameter set and the first transmission parameter set comprise the first antenna port group.

In one subsidiary embodiment of this sub-embodiment, the K1 first radio sub-signals are all generated by the same sequence.

In one subsidiary embodiment of this sub-embodiment, the K1 first radio sub-signals are transmitted using K1 candidate transmission parameter sets, respectively.

In one subsidiary embodiment of this sub-embodiment, the K1 first radio sub-signals are transmitted in a sweeping manner.

In one subsidiary embodiment of this sub-embodiment, the K1 first radio sub-signals are all transmitted using the second transmission parameter set.

In one sub-embodiment, the base station N1 does not know the air interface resource occupied by the first radio signal before receiving the first radio signal.

In one sub-embodiment, the air interface resource in the disclosure is one of a time domain resource, a frequency domain resource, and a code domain resource.

In one sub-embodiment, the base station N1 determines the position of the time-frequency resource occupied by the first radio signal by using energy detection, or the base station N1 determines the position of the time-frequency resource occupied by the first radio signal by using feature sequence detection.

In one sub-embodiment, the first radio signal occupies a first air interface resource in the first air interface resource pool, the first air interface resource occupies a first RE set, the first RE set occupies a positive integer number of Res; the first power detected by the base station N1 in the first RE set is greater than a first threshold, the base station N1 considers that the first radio signal is detected in the first RE set; the first power detected by the base station N1 in the first RE set is not greater than a first threshold, and the base station N1 considers that the first radio signal is not detected in the first RE set.

In one subsidiary embodiment of this sub-embodiment, the first power is the Reference Signal Received Power (RSRP) for the first radio signal, or the first power is the Reference Signal Received Quality (RSRQ) for the first radio signal, or the first power is a the Received Signal Strength Indicator (RSSI) for the first radio signal.

In one subsidiary embodiment of this sub-embodiment, the first power is an average power on the first RE set.

In one subsidiary embodiment of this sub-embodiment, the unit of the first power is milliwatts (mW).

In one subsidiary embodiment of this sub-embodiment, the unit of the first power is milli-decibels (dBm).

In one sub-embodiment, the base station N1 does not know the air interface resources occupied by the second radio signal before receiving the second radio signal.

In one sub-embodiment, the base station N1 determines the position of the time-frequency resource occupied by the second radio signal by using energy detection, or the base station N1 determines the position of the time-frequency resource occupied by the second radio signal by using feature sequence detection.

Embodiment 6

Figures 6, 7:
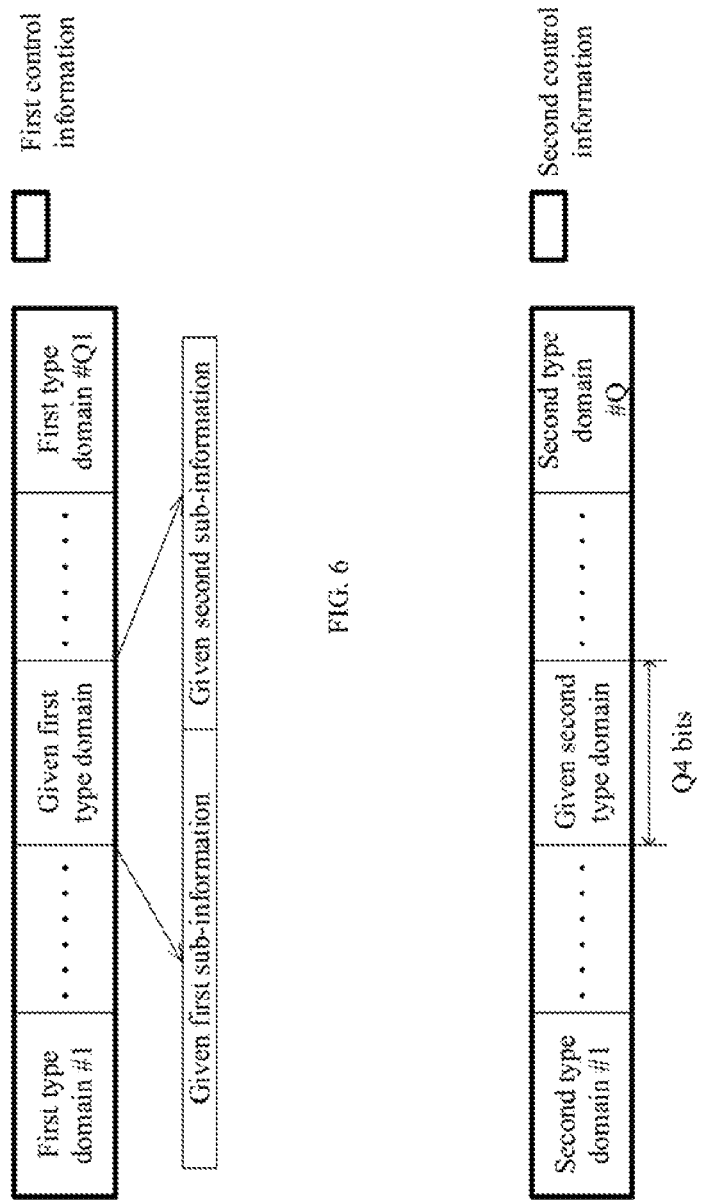
FIG. 6 is a schematic diagram illustrating first control information according to one embodiment of the disclosure.
FIG. 7 is a schematic diagram illustrating second control information according to one embodiment of the disclosure.

Embodiment 6 illustrates a schematic diagram of the first control information, as shown in FIG. 6. In FIG. 6, the first control information comprises Q1 first type domain(s), such as the first type domain #1 to the first type domain #Q1 in the figure, and the Q1 first type domain(s) corresponds (correspond) to Q1 first-type air interface resource pool(s), respectively; a given first type domain is any one of the Q1 first type domain(s), the given first type domain corresponds to the given first-type air interface resource pool in the Q1 first-type air interface resource pool(s); the given first type domain comprises given first sub-information and given second sub-information, the given first sub-information is used to indicate the TA used for data transmission of a terminal transmitting an uplink radio signal in a given first-type air interface resource pool, and the given second sub-information is used to indicate the multi-antenna-related transmission parameter set used for data transmission of a terminal transmitting an uplink radio signal in a given first-type air interface resource pool.

In one sub-embodiment, the first control information comprises Q2 bits, the value of the Q2 is fixed, or the value of the Q2 is configured through higher-layer signaling; and the Q2 is a positive integer.

In one subsidiary embodiment of this sub-embodiment, the number of bits included in the given first type domain is Q3, the product of Q3 and Q1 is equal to Q2; and the Q3 is a positive integer.

In one sub-embodiment, the first control information comprises Q2 bits, and the value of the Q2 is linearly related to the value of the Q1.

In one subsidiary embodiment of this sub-embodiment, the number of bits included in the given first type domain is Q3, the product of Q3 and Q1 is equal to Q2, and the value of the Q3 is fixed.

In one sub-embodiment, the given first-type air interface resource pool is the first air interface resource pool in the disclosure, and the given first sub-information and the given second sub-information included in the given first type domain correspond to the first information and the second information in the disclosure, respectively.

Embodiment 7

Embodiment 7 illustrates a schematic diagram of the second control information, as shown in FIG. 7. In FIG. 7, the second control information comprises Q second type domains, such as the second type domain #1 to the second type domain #Q in the figure, and the Q second type domains correspond to Q first-type air interface resource pools, respectively; a given second type domain is any one of the Q second type domains, and the given second type domain corresponds to the given first-type air interface resource pool in the Q first-type air interface resource pools.

In one sub-embodiment, the given second type domain comprises Q4 bits, the given first-type air interface resource pool comprises Q4 air interface resources, the Q4 bits are used to indicate whether the uplink transmission on the Q4 air interface resources is correctly received; and the Q4 is a positive integer.

In one subsidiary embodiment of this sub-embodiment, the Q4 is equal to one.

In one sub-embodiment, the base station in the disclosure correctly receives the uplink radio signal in the Q1 first-type air interface resource pool(s) in the Q first-type air interface resource pools, and Q1 second type domain(s) of the Q second type domains is(are) used to indicate that the uplink radio signal is correctly received in the Q1 first-type air interface resource pool(s).

In one subsidiary embodiment of this sub-embodiment, the first control information in Embodiment 6 corresponds to the Q1 first-type air interface resource pool(s) that correctly receive uplink radio signals.

Embodiment 8

Figure 8:
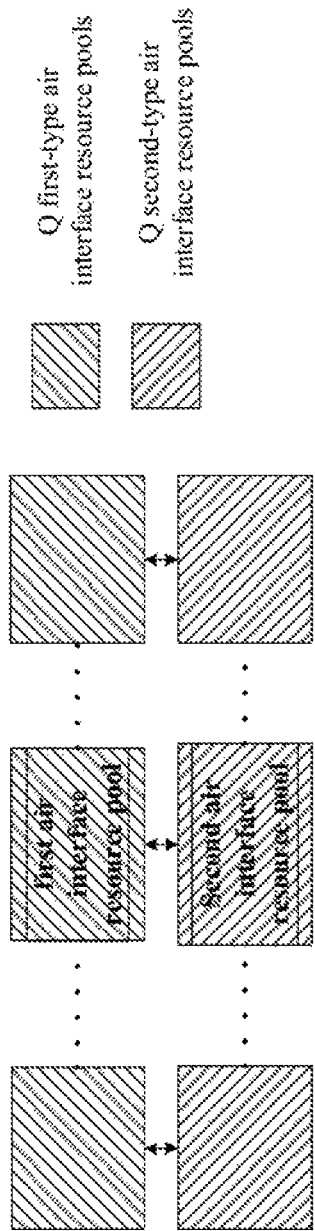
FIG. 8 is a schematic diagram illustrating a first air interface resource pool and a second air interface resource pool according to one embodiment of the disclosure.

Embodiment 8 illustrates a schematic diagram of a first air interface resource pool and a second air interface resource pool, as shown in FIG. 8. In FIG. 8, the first air interface resource pool is one of the Q first-type air interface resource pools, and the second air interface resource pool is one of the Q second-type air interface resource pools; the index of the first air interface resource pool in the Q first-type air interface resource pools is equal to the index of the second air interface resource pool in the Q second-type air interface resource pools; and the Q first-type air interface resource pools correspond to the Q second-type air interface resource pools one by one, respectively.

In one sub-embodiment, any one of the Q first-type air interface resource pools includes a positive integer number of REs.

In one sub-embodiment, any one of the Q second-type air interface resource pools includes a positive integer number of REs.

In one sub-embodiment, any two of the Q first-type air interface resource pools occupy the same number of REs.

In one sub-embodiment, any two of the Q second-type air interface resource pools occupy the same number of REs.

In one sub-embodiment, any two of the Q first-type air interface resource pools are orthogonal in the time domain.

In one sub-embodiment, any two of the Q first-type air interface resource pools are orthogonal in the frequency domain.

In one sub-embodiment, any two of the Q first-type air interface resource pools are orthogonal in the code domain.

In one sub-embodiment, any two of the Q second-type air interface resource pools are orthogonal in the time domain.

In one sub-embodiment, any two of the Q second-type air interface resource pools are orthogonal in the frequency domain.

In one sub-embodiment, any two of the Q second-type air interface resource pools are orthogonal in the code domain.

Embodiment 9

Figure 9:
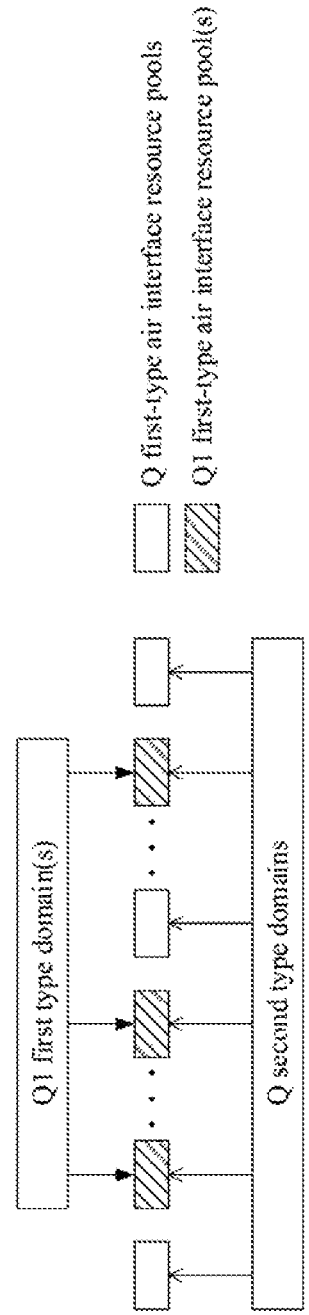
FIG. 9 is a schematic diagram illustrating Q first-type air interface resource pools and the Q second type domains according to one embodiment of the disclosure.

Embodiment 9 illustrates a schematic diagram of Q first-type air interface resource pools and the Q second type domains, as shown in FIG. 9. In FIG. 9, the base station indicates that an uplink radio signal is detected in the Q1 first-type air interface resource pool(s) in the Q first-type air interface resource pools by using the Q second type domains, and indicates a related information set at the transmitting end corresponding to the Q1 first-type air interface resource pool(s) by using the first control information in the disclosure; and the related information set includes at least one of the TA and the multi-antenna-related transmission parameter set.

In one sub-embodiment, the base station detects Q1 uplink radio signal(s) transmitted by the Q1 terminal(s) in the Q1 first-type air interface resource pool(s), where the first control information includes Q1 first type domain(s); and the Q1 first type domain(s) is(are) used to indicate at least one of the TA and the multi-antenna-related transmission parameter set used for uplink transmission of the Q1 terminal(s), respectively.

In one subsidiary embodiment of this sub-embodiment, the uplink transmission is grant-free, or the uplink transmission is based on contention.

In one sub-embodiment, the detected Q1 uplink radio signal(s) transmitted by the Q1 terminal(s) is(are) Q1 Demodulation Reference Signal(s) (DMRS(DMRSs)), respectively.

In one sub-embodiment, the detected Q1 uplink radio signal(s) transmitted by the Q1 terminal(s) is(are) Q1 preamble(preambles), respectively.

In one subsidiary embodiment of the above two sub-embodiments, the Q1 uplink radio signal(s) is(are) scrambled by the user identifiers of the Q1 terminal(s), respectively; or the Q1 uplink radio signal(s) is(are) generated by the user identifiers of the Q1 terminal(s), respectively.

In one subsidiary embodiment of the above two sub-embodiments, the Q1 uplink radio signal(s) is(are) orthogonal in the code domain; or the Q1 uplink radio signal(s) is(are) orthogonal in the time domain; or the Q1 uplink radio signal(s) is(are) orthogonal in the frequency domain.

Embodiment 10

Figure 10:
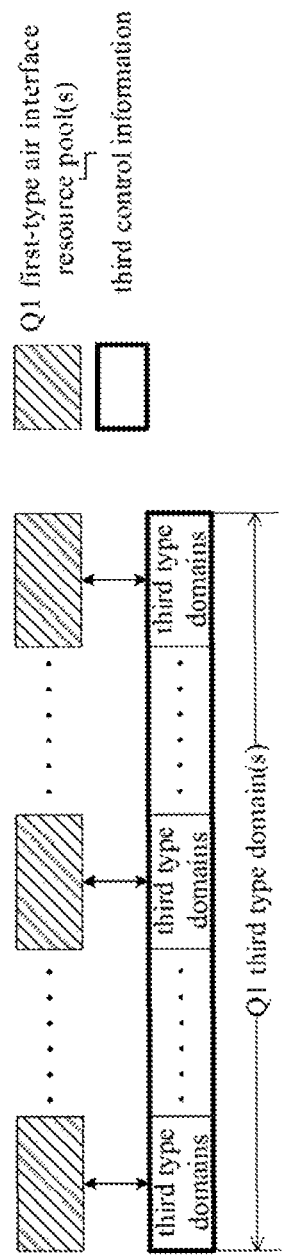
FIG. 10 is a schematic diagram illustrating third control information according to one embodiment of the disclosure.

Embodiment 10 illustrates a schematic diagram of the third control information, as shown in FIG. 10. In FIG. 10, the third control information includes Q1 third type domain(s), and the Q1 third type domain(s) is(are) used to indicate whether the radio signals in the Q1 first-type air interface resource pool(s) is(are) correctly decoded, respectively.

In one sub-embodiment, the given third type domain is any one of the Q1 third type domain(s), the given first-type air interface resource pool is the first-type air interface resource pool associated with the given third type domain in the Q1 first-type air interface resource pool(s); and the given third type domain is used to determine whether a radio signal in the given first-type air interface resource pool is correctly decoded.

In one subsidiary embodiment of this sub-embodiment, the given third type domain includes R1 bits, the R1 is a positive integer; the R1 is fixed, or the R1 is configured through higher layer signaling.

In one example of the subsidiary embodiment, the given first-type air interface resource pool includes R1 candidate first-type air interface resources, and the R1 bits included in the given third type domain are used to indicate whether the radio signals in the R1 candidate first-type air interface resources are correctly decoded, respectively.

In one subsidiary embodiment of this sub-embodiment, the given third type domain includes only 1 bit.

In one example of the subsidiary embodiment, the given first-type air interface resource pool includes R1 candidate first-type air interface resources, and the 1 bit included in the given third type domain is used to indicate whether all of the radio signals in the R1 candidate first-class air interface resources are correctly decoded.

Embodiment 11

Figure 11:
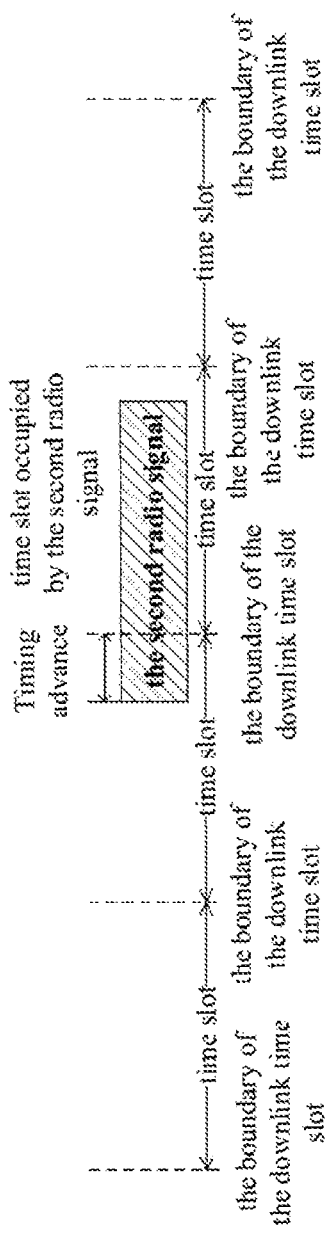
FIG. 11 is a schematic diagram illustrating timing advance of a second radio signal according to one embodiment of the disclosure.

Embodiment 11 illustrates a schematic diagram of timing advance of a second radio signal, as shown in FIG. 11. In FIG. 11, the dotted line corresponds to the boundary of the downlink time slot obtained by the user equipment according to the SSB transmitted by the base station, and the timing advance of the second radio signal refers to a negative offset of the start time of the uplink time slot occupied by the second radio signal transmitted based on the boundary of the downlink time slot and the start time of the downlink time slot.

In one sub-embodiment, the unit of timing advance is milliseconds.

In one sub-embodiment, the unit of timing advance is microseconds.

In one sub-embodiment, the value of the timing advance corresponds to the duration of a positive integer number of multi-carrier symbols.

Embodiment 12

Figure 12:
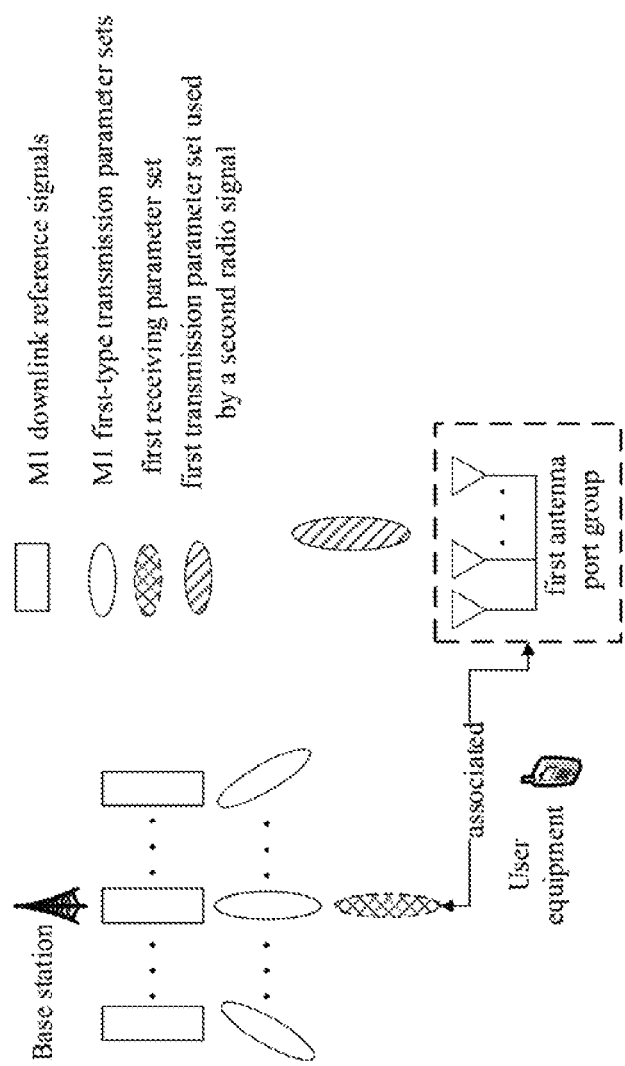
FIG. 12 is a schematic diagram illustrating M1 downlink reference signals according to one embodiment of the disclosure.

Embodiment 12 illustrates a schematic diagram of M1 downlink reference signals of one embodiment, as shown in FIG. 12. In FIG. 12, the M1 downlink reference signals are transmitted using M1 first-type transmission parameter sets, respectively, and the second information in the disclosure is used to indicate the downlink target reference signal from the M1 downlink reference signals; the first receiving parameter set is used to receive the downlink target reference signal, and the first receiving parameter set is related to the first transmission parameter set; the second radio signal in the disclosure is transmitted using a first antenna port group, the first transmission parameter set comprises the first antenna port group; and the M1 is a positive integer greater than 1.

In one sub-embodiment, the M1 downlink reference signals are M1 CSI-RSs, respectively.

In one sub-embodiment, the M1 downlink reference signals are M1 SSBs, respectively.

Embodiment 13

Figure 13:
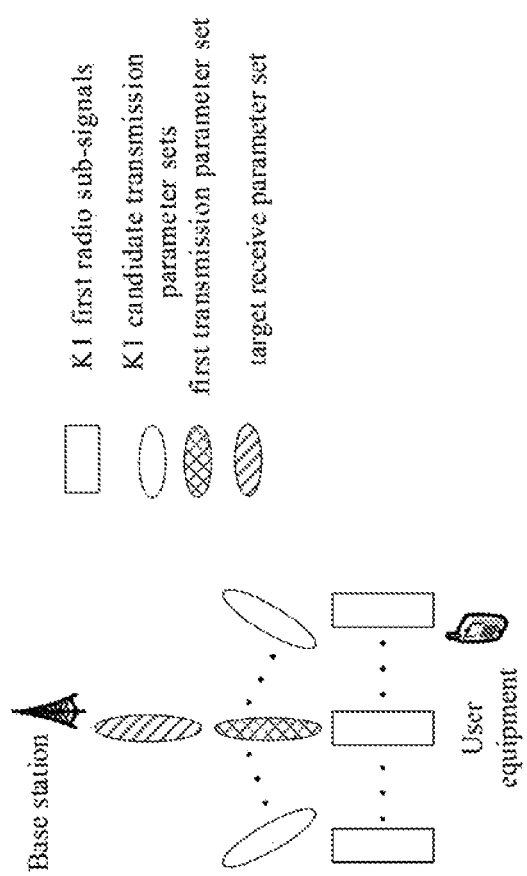
FIG. 13 is a schematic diagram illustrating K1 first radio sub-signals according to one embodiment of the disclosure.

Embodiment 13 illustrates a schematic diagram of K1 first radio sub-signals, as shown in FIG. 13. In FIG. 13, the first radio signal in the disclosure comprises the K1 first radio sub-signals; the K1 first radio sub-signals are transmitted using K1 candidate transmission parameter sets, respectively; the first transmission parameter set in the disclosure is one of the K1 candidate transmission parameter sets, and the second information in the disclosure is used to indicate the first transmission parameter set from the K1 candidate transmission parameter sets; the base station in the disclosure receives the K1 first radio sub-signals using a target receiving parameter set, the received given first radio sub-signal is the best of the K1 first radio sub-signals, and the base station then receives the second radio signal using the target receive parameter set.

In one sub-embodiment, the K1 first radio sub-signals correspond to K1 DMRSs, respectively.

In one sub-embodiment, the K1 first radio sub-signals correspond to K1 preambles, respectively.

In one sub-embodiment, the K1 first radio sub-signals are transmitted in a sweeping manner.

In one sub-embodiment, the target receiving parameter set and the first transmission parameter set are QCL.

Embodiment 14

Figure 14:
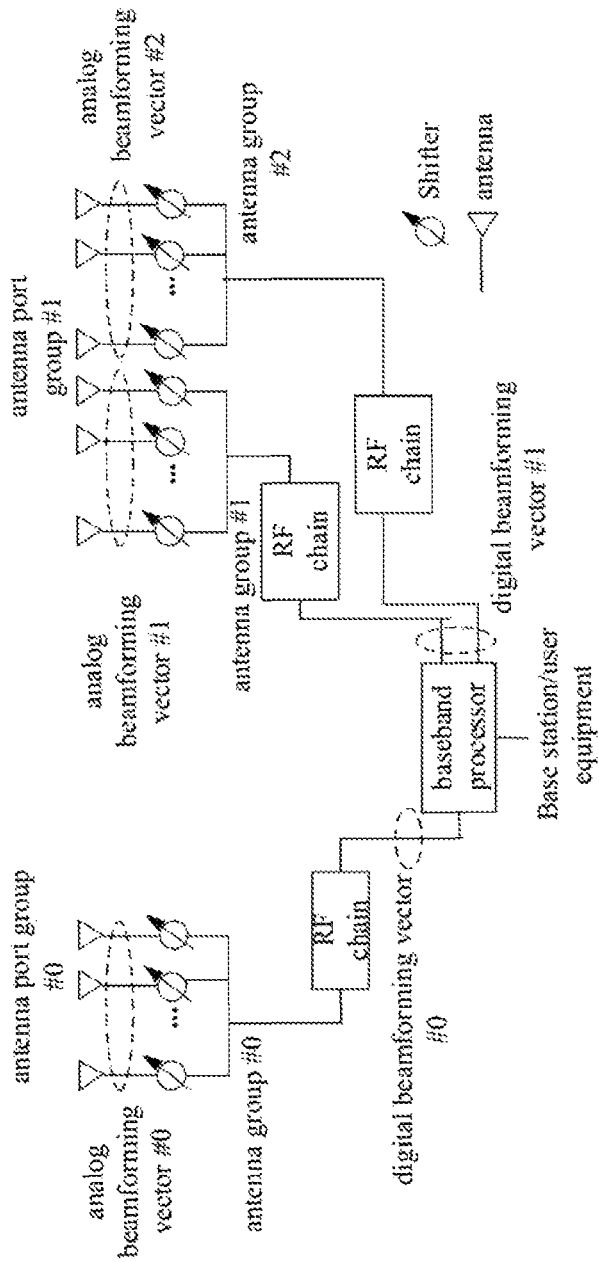
FIG. 14 is a schematic diagram illustrating an antenna port and an antenna port group according to the disclosure.

Embodiment 14 illustrates a schematic diagram of an antenna port and an antenna port group, as shown in FIG. 14.

In Embodiment 14, one antenna port group comprises a positive integer number of antenna ports; one antenna port is formed by superimposing antennas in a positive integer number of antenna groups through antenna virtualization; and one antenna group comprises a positive integer number of antennas. An antenna group is connected to a baseband processor through a Radio Frequency (RF) chain, and different antenna groups correspond to different RF chains. A mapping coefficient of all antennas within a positive integer number of antenna groups included in a given antenna port to the given antenna port constitutes a beamforming vector corresponding to the given antenna port. The mapping coefficients of a plurality of antennas included in any given antenna group within a positive integer number of antenna groups included in a given antenna port to the given antenna port constitute an analog beamforming vector of the given antenna group. The diagonal arrangement of the analog beamforming vectors corresponding to the positive integer number of antenna groups constitutes an analog beamforming matrix corresponding to the given antenna port. The mapping coefficients of the positive integer number of antenna groups to the given antenna port constitute a digital beamforming vector corresponding to the given antenna port. The beamforming vector corresponding to the given antenna port is obtained by the product of the analog beamforming matrix and the digital beamforming vector corresponding to the given antenna port. Different antenna ports in one antenna port group are consisted of the same antenna group, and different antenna ports in the same antenna port group correspond to different beamforming vectors.

Two antenna port groups are shown in FIG. 14: an antenna port group #0 and an antenna port group #1. The antenna port group #0 is consisted of an antenna group #0, and the antenna port group #1 is consisted of an antenna group #1 and an antenna group #2. The mapping coefficients of a plurality of antennas in the antenna group #0 to the antenna port group #0 constitute an analog beamforming vector #0, and the mapping coefficients of the antenna group #0 to the antenna port group #0 constitute a digital beamforming vector #0. The mapping coefficients of a plurality of antennas in the antenna group #1 and a plurality of antennas in the antenna group #2 to the antenna port group #1 constitute an analog beamforming vector #1 and an analog beamforming vector #2, respectively. The mapping coefficients of the antenna group #1 and the antenna group #2 to the antenna port group #1 constitute a digital beamforming vector #1. A beamforming vector corresponding to any antenna port in the antenna port group #0 is obtained by the product of the analog beamforming vector #0 and the digital beamforming vector #0. The beamforming vector corresponding to any antenna port in the antenna port group #1 is obtained by the product of an analog beamforming matrix constituted by the diagonal arrangement of the analog beamforming vector #1 and the analog beamforming vector #2 and the digital beamforming vector #1.

In one sub-embodiment, the first antenna port group in the disclosure corresponds to the antenna port group #0 in the figure, or the first antenna port group in the disclosure corresponds to the antenna port group #1 in the figure.

In one sub-embodiment, one antenna port group comprises one antenna port. For example, the antenna port group #0 in FIG. 14 comprises one antenna port.

In one subsidiary embodiment of the above sub-embodiment, the analog beamforming matrix corresponding to the one antenna port is dimensionally reduced to an analog beamforming vector, the digital beamforming vector corresponding to the one antenna port is dimensionally reduced to a scalar, and the beamforming vector corresponding to the one antenna port is equal to the analog beamforming vector corresponding to the one antenna port.

In one sub-embodiment, one antenna port group comprises a plurality of antenna ports. For example, the antenna port group #1 in FIG. 14 comprises a plurality of antenna ports.

In one subsidiary embodiment of the above sub-embodiment, the plurality of antenna ports correspond to the same analog beamforming matrix and different digital beamforming vectors.

In one sub-embodiment, antenna ports in different antenna port groups correspond to different analog beamforming matrices.

In one sub-embodiment, any two antenna ports in an antenna port group are QCL.

In one sub-embodiment, any two antenna ports in an antenna port group are spatial QCL.

Embodiment 15

Figure 15:
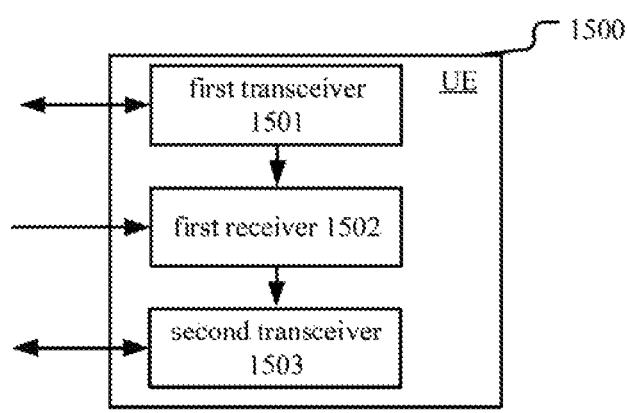
FIG. 15 is a block diagram illustrating a structure of a processing device in user equipment according to one embodiment of the disclosure.

Embodiment 15 is a block diagram illustrating a structure of a processing device in UE, as shown in FIG. 15. In FIG. 15, the UE processing device 1500 comprises a first transceiver 1501, a first receiver 1502, and a second transceiver 1503.

The first transceiver 1501 is configured to transmit a first radio signal in a first air interface resource pool.

The first receiver 1502 is configured to receive the first control information.

The second transceiver 1503 is configured to transmit a second radio signal in a second air interface resource pool.

In Embodiment 15, the first control information is physical layer signaling, the second air interface resource pool is associated with the first air interface resource pool; the first control information comprises at least one of the first information and the second information; the timing advance of the second radio signal is related to the first information, a first transmission parameter set for transmitting the second radio signal is related to the second information; and the transmission of the second radio signal is grant-free.

In one sub-embodiment, the first receiver 1502 further receives second control information; the second control information comprises Q second type domains, and the Q second type domains correspond to Q first-type air interface resource pools, respectively; the first control information comprises Q1 first type domain(s), the Q1 first type domain(s) corresponds(correspond) to Q1 first-type air interface resource pool(s), respectively, and the first air interface resource pool is a first-type air interface resource pool in the Q1 first-type air interface resource pool(s); the Q1 first-type air interface resource pool(s) is(are) a subset of the Q first-type air interface resource pools; the Q is a positive integer not less than the Q1; the Q1 is a positive integer; the second control information is used for at least one of:

indicating a first type domain corresponding to the first air interface resource pool in the Q1 first type domain(s); and indicating the Q1 first-type air interface resource pool(s) from the Q first-type air interface resource pools.

In one sub-embodiment, the second transceiver module 1503 further receives third control information in the third air interface resource pool; the third control information comprises Q1 third type domain(s), and the Q1 third type domain(s) is(are) used to indicate whether the radio signals in the Q1 first-type air interface resource pool(s) is(are) correctly decoded, respectively.

In one sub-embodiment, a target first type domain is a first type domain corresponding to the first air interface resource pool in the Q1 first type domain(s), and the number of bits included in the target first type domain is related to the Q1.

In one sub-embodiment, the first transceiver 1501 further receives M1 downlink reference signals; a downlink target reference signal is one of the M1 downlink reference signals, and the second information is used to indicate the downlink target reference signal from the M1 downlink reference signals; the first receiving parameter set is used to receive the downlink target reference signal, and the first receiving parameter set is related to the first transmission parameter set; and the M1 is a positive integer greater than 1.

In one sub-embodiment, the first radio signal comprises K1 first radio sub-signals, and the K1 first radio sub-signals are transmitted in K1 multi-carrier symbol groups, respectively; a target radio sub-signal is a first radio sub-signal in the K1 first radio sub-signals, the second information is used to indicate the target radio sub-signal from the K1 first radio sub-signals, a second transmission parameter set is used to transmit the target radio sub-signal, and the second transmission parameter set is related to the first transmission parameter set.

In one sub-embodiment, the first transceiver 1501 comprises at least the first four of the receiver/transmitter 456, the receiving processor 452, the transmitting processor 455, and the controller/processor 490 in Embodiment 4.

In one sub-embodiment, the first receiver 1502 comprises at least the first two of the receiver 456, the receiving processor 452, and the controller/processor 490 in Embodiment 4.

In one sub-embodiment, the second transceiver 1503 comprises at least the first four of the receiver/transmitter 456, the receiving processor 452, the transmitting processor 455, and the controller/processor 490 in Embodiment 4.

Embodiment 16

Figure 16:
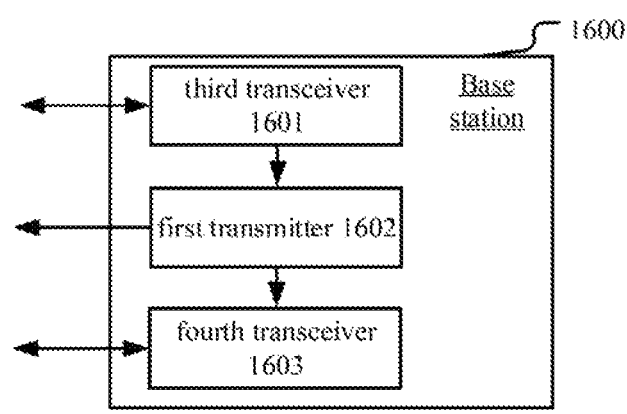
FIG. 16 is a block diagram illustrating a structure of a processing device in a base station according to one embodiment of the disclosure.

Embodiment 16 is a block diagram illustrating a structure of a processing device in a base station, as shown in FIG. 16. In FIG. 16, the base station processing device 1600 comprises a third transceiver 1601, a first transmitter 1602, and a fourth transceiver 1603.

The third transceiver 1601 is configured to receive a first radio signal in a first air interface resource pool.

The first transmitter 1602 is configured to transmit the first control information.

The fourth transceiver 1603 is configured to receive a second radio signal in a second air interface resource pool.

In Embodiment 16, the first control information is physical layer signaling, the second air interface resource pool is associated with the first air interface resource pool; the first control information comprises at least one of the first information and the second information; the timing advance of the second radio signal is related to the first information, a first transmission parameter set for transmitting the second radio signal is related to the second information; and the transmission of the second radio signal is grant-free.

In one sub-embodiment, the first transmitter 1602 further transmits second control information; the second control information comprises Q second type domains, and the Q second type domains correspond to Q first-type air interface resource pools, respectively; the first control information comprises Q1 first type domain(s), the Q1 first type domain(s) corresponds(correspond) to Q1 first-type air interface resource pool(s), respectively, and the first air interface resource pool is a first-type air interface resource pool in the Q1 first-type air interface resource pool(s); the Q1 first-type air interface resource pool(s) is(are) a subset of the Q first-type air interface resource pools; the Q is a positive integer not less than the Q1; the Q1 is a positive integer; the second control information is used for at least one of:

indicating a first type domain corresponding to the first air interface resource pool in the Q1 first type domain(s); and indicating the Q1 first-type air interface resource pool(s) from the Q first-type air interface resource pools.

In one sub-embodiment, the fourth transceiver 1603 further transmits third control information in the third air interface resource pool; the third control information comprises Q1 third type domain(s), and the Q1 third type domain(s) is(are) used to indicate whether the radio signals in the Q1 first-type air interface resource pool(s) is(are) correctly decoded, respectively.

In one sub-embodiment, a target first type domain is a first type domain corresponding to the first air interface resource pool in the Q1 first type domain(s), and the number of bits included in the target first type domain is related to the Q1.

In one sub-embodiment, the third transceiver 1601 further transmits M1 downlink reference signals; a downlink target reference signal is one of the M1 downlink reference signals, and the second information is used to indicate the downlink target reference signal from the M1 downlink reference signals; the first receiving parameter set is used to receive the downlink target reference signal, and the first receiving parameter set is related to the first transmission parameter set; and the M1 is a positive integer greater than 1.

In one sub-embodiment, the first radio signal comprises K1 first radio sub-signals, and the K1 first radio sub-signals are transmitted in K1 multi-carrier symbol groups, respectively; a target radio sub-signal is a first radio sub-signal in the K1 first radio sub-signals, the second information is used to indicate the target radio sub-signal from the K1 first radio sub-signals, a second transmission parameter set is used to transmit the target radio sub-signal, and the second transmission parameter set is related to the first transmission parameter set.

In one sub-embodiment, the third transceiver 1601 comprises at least the first four of the receiver/transmitter 416, the transmitting processor 415, the receiving processor 412, and the controller/processor 440 in Embodiment 4.

In one sub-embodiment, the first transmitter 1602 comprises at least the first two of the transmitter 416, the transmitting processor 415, and the controller/processor 440 in Embodiment 4.

In one sub-embodiment, the fourth transceiver 1603 comprises at least the first four of the receiver/transmitter 416, the transmitting processor 415, the receiving processor 412, and the controller/processor 440 in Embodiment 4.

One of ordinary skill in the art can appreciate that all or part of the above steps can be completed by a program to instruct related hardware. The program can be stored in a computer-readable storage medium such as a read only memory, a hard disk or an optical disk. Alternatively, all or part of the steps of the above embodiments may also be implemented using one or more integrated circuits. Correspondingly, each module unit in the above embodiment may be implemented in hardware form or in the form of a software function module. The disclosure is not limited to any specific combination of software and hardware. The user equipment, terminal and UE in the disclosure include, but are not limited to, a drone, a communication module on the drone, a remote control aircraft, an aircraft, a small aircraft, a mobile phone, a tablet computer, a notebook, a vehicle communication device, a wireless sensor, an internet card, an Internet of Things terminal, an RFID terminal, an NB-IOT terminal, a Machine Type Communication (MTC) terminal, an enhanced MTC (eMTC) terminal, a data card, an internet card, a vehicle communication device, a low-cost mobile phone, a low-cost tablet computer, etc. The base station in the disclosure includes, but is not limited to, a macro communication base station, a micro cell base station, a home base station, a relay base station, an NR Node B (gNB), a Transmitter Receiver Point (TRP), and other wireless communication devices.

The above is only the preferred embodiment of the disclosure and is not intended to limit the scope of protection the disclosure. Any modifications, equivalents, improvements, etc., which are made within the spirit and principle of the disclosure, are intended to be included within the scope of protection the disclosure.

What is claimed is:

1. A method in user equipment for wireless communication, comprising:
   transmitting a first radio signal in a first air interface resource pool;
   receiving second control information;
   receiving first control information; and
   transmitting a second radio signal in a second air interface resource pool;
   wherein the first control information is physical layer signaling, the second air interface resource pool is associated with the first air interface resource pool; the first control information comprises at least one of a first information and a second information; a timing advance of the second radio signal is related to the first information, a first transmission parameter set for transmitting the second radio signal is related to the second information; and the transmission of the second radio signal is grant-free; the second control information comprises Q second type domains, and the Q second type domains correspond to Q first-type air interface resource pools, respectively; the first control information comprises Q1 first type domain(s), the Q1 first type domain(s) corresponds(correspond) to Q1 first-type air interface resource pool(s), respectively, and the first air interface resource pool is a first-type air interface resource pool in the Q1 first-type air interface resource pool(s); the Q1 first-type air interface resource pool(s) is(are) a subset of the Q first-type air interface resource pools; the Q is a positive integer not less than the Q1; the Q1 is a positive integer; the second control information is used for at least one of:
   indicating a first type domain corresponding to the first air interface resource pool in the Q1 first type domain(s); and
   indicating the Q1 first-type air interface resource pool(s) from the Q first-type air interface resource pools.

2. The method according to claim 1, comprising:
   receiving third control information in the third air interface resource pool;
   wherein the third control information comprises Q1 third type domain(s), and the Q1 third type domain(s) is(are) used to indicate whether the radio signal(s) in the Q1 first-type air interface resource pool(s) is(are) correctly decoded, respectively.

3. The method according to claim 1, wherein a target first type domain is a first type domain corresponding to the first air interface resource pool in the Q1 first type domain(s), and the number of bits included in the target first type domain is related to the Q1;
   or the first radio signal comprises K1 first radio sub-signals, and the K1 first radio sub-signals are transmitted in K1 multi-carrier symbol groups, respectively; a target radio sub-signal is a first radio sub-signal in the K1 first radio sub-signals, the second information is used to indicate the target radio sub-signal from the K1 first radio sub-signals, a second transmission parameter set is used to transmit the target radio sub-signal, and the second transmission parameter set is related to the first transmission parameter set.

4. The method according to claim 1, comprising:
   receiving M1 downlink reference signals;
   wherein a downlink target reference signal is one of the M1 downlink reference signals, and the second information is used to indicate the downlink target reference signal from the M1 downlink reference signals; a first receiving parameter set is used to receive the downlink target reference signal, and the first receiving parameter set is related to the first transmission parameter set; and the M1 is a positive integer greater than 1.

5. A method in a base station for wireless communication, comprising:
   receiving a first radio signal in a first air interface resource pool;
   transmitting second control information;
   transmitting first control information; and
   receiving a second radio signal in a second air interface resource pool;
   wherein the first control information is physical layer signaling, the second air interface resource pool is associated with the first air interface resource pool; the first control information comprises at least one of a first information and a second information; a timing advance of the second radio signal is related to the first information, a first transmission parameter set for transmitting the second radio signal is related to the second information; and the transmission of the second radio signal is grant-free; the second control information comprises Q second type domains, and the Q second type domains correspond to Q first-type air interface resource pools, respectively; the first control information comprises Q1 first type domain(s), the Q1 first type domain(s) corresponds(correspond) to Q1 first-type air interface resource pool(s), respectively, and the first air interface resource pool is a first-type air interface resource pool in the Q1 first-type air interface resource pool(s); the Q1 first-type air interface resource pool(s) is(are) a subset of the Q first-type air interface resource pools; the Q is a positive integer not less than the Q1; the Q1 is a positive integer; the second control information is used for at least one of:
   indicating a first type domain corresponding to the first air interface resource pool in the Q1 first type domain(s); and
   indicating the Q1 first-type air interface resource pool(s) from the Q first-type air interface resource pools.

6. The method according to claim 5, comprising:
   transmitting third control information in the third air interface resource pool;

wherein the third control information comprises Q1 third type domain(s), and the Q1 third type domain(s) is(are) used to indicate whether the radio signal(s) in the Q1 first-type air interface resource pool(s) is(are) correctly decoded, respectively.

7. The method according to claim 5, wherein a target first type domain is a first type domain corresponding to the first air interface resource pool in the Q1 first type domain(s), and the number of bits included in the target first type domain is related to the Q1;
or the first radio signal comprises K1 first radio sub-signals, and the K1 first radio sub-signals are transmitted in K1 multi-carrier symbol groups, respectively; a target radio sub-signal is a first radio sub-signal in the K1 first radio sub-signals, the second information is used to indicate the target radio sub-signal from the K1 first radio sub-signals, a second transmission parameter set is used to transmit the target radio sub-signal, and the second transmission parameter set is related to the first transmission parameter set.

8. The method according to claim 5, comprising:
transmitting M1 downlink reference signals;
wherein a downlink target reference signal is one of the M1 downlink reference signals, and the second information is used to indicate the downlink target reference signal from the M1 downlink reference signals; a first receiving parameter set is used to receive the downlink target reference signal, and the first receiving parameter set is related to the first transmission parameter set; and the M1 is a positive integer greater than 1.

9. User equipment for wireless communication, comprising:
a first transceiver configured to transmit a first radio signal in a first air interface resource pool;
a first receiver configured to receive second control information and receive first control information; and
a second transceiver configured to transmit a second radio signal in a second air interface resource pool;
wherein the first control information is physical layer signaling, the second air interface resource pool is associated with the first air interface resource pool; the first control information comprises at least one of a first information and a second information; a timing advance of the second radio signal is related to the first information, a first transmission parameter set for transmitting the second radio signal is related to the second information; and the transmission of the second radio signal is grant-free; the second control information comprises Q second type domains, and the Q second type domains correspond to Q first-type air interface resource pools, respectively; the first control information comprises Q1 first type domain(s), the Q1 first type domain(s) corresponds(correspond) to Q1 first-type air interface resource pool(s), respectively, and the first air interface resource pool is a first-type air interface resource pool in the Q1 first-type air interface resource pool(s); the Q1 first-type air interface resource pool(s) is(are) a subset of the Q first-type air interface resource pools; the Q is a positive integer not less than the Q1; the Q1 is a positive integer; the second control information is used for at least one of:
indicating a first type domain corresponding to the first air interface resource pool in the Q1 first type domain(s); and
indicating the Q1 first-type air interface resource pool(s) from the Q first-type air interface resource pools.

10. The user equipment according to claim 9, wherein the second transceiver further receives third control information in the third air interface resource pool;
the third control information comprises Q1 third type domain(s), and the Q1 third type domain(s) is(are) used to indicate whether the radio signal(s) in the Q1 first-type air interface resource pool(s) is(are) correctly decoded, respectively.

11. The user equipment according to claim 9, wherein the first transceiver further receives M1 downlink reference signals; a downlink target reference signal is one of the M1 downlink reference signals, and the second information is used to indicate the downlink target reference signal from the M1 downlink reference signals; a first receiving parameter set is used to receive the downlink target reference signal, and the first receiving parameter set is related to the first transmission parameter set; and the M1 is a positive integer greater than 1.

12. The user equipment according to claim 9, wherein a target first type domain is a first type domain corresponding to the first air interface resource pool in the Q1 first type domain(s), and the number of bits included in the target first type domain is related to the Q1;
or the first radio signal comprises K1 first radio sub-signals, and the K1 first radio sub-signals are transmitted in K1 multi-carrier symbol groups, respectively; a target radio sub-signal is a first radio sub-signal in the K1 first radio sub-signals, the second information is used to indicate the target radio sub-signal from the K1 first radio sub-signals, a second transmission parameter set is used to transmit the target radio sub-signal, and the second transmission parameter set is related to the first transmission parameter set.

13. A base station for wireless communication, comprising:
a third transceiver configured to receive a first radio signal in a first air interface resource pool;
a first transmitter configured to transmit second control information and transmit first control information; and
a fourth transceiver configured to receive a second radio signal in a second air interface resource pool;
wherein the first control information is physical layer signaling, the second air interface resource pool is associated with the first air interface resource pool; the first control information comprises at least one of a first information and a second information; a timing advance of the second radio signal is related to the first information, a first transmission parameter set for transmitting the second radio signal is related to the second information; and the transmission of the second radio signal is grant-free; the second control information comprises Q second type domains, and the Q second type domains correspond to Q first-type air interface resource pools, respectively; the first control information comprises Q1 first type domain(s), the Q1 first type domain(s) corresponds(correspond) to Q1 first-type air interface resource pool(s), respectively, and the first air interface resource pool is a first-type air interface resource pool in the Q1 first-type air interface resource pool(s); the Q1 first-type air interface resource pool(s) is(are) a subset of the Q first-type air interface resource pools; the Q is a positive integer not less than the Q1; the Q1 is a positive integer; the second control information is used for at least one of:
indicating a first type domain corresponding to the first air interface resource pool in the Q1 first type domain(s); and indicating the Q1 first-type air interface resource pool(s) from the Q first-type air interface resource pools.

14. The base station according to claim 13, wherein the fourth transceiver further transmits third control information in the third air interface resource pool; the third control information comprises Q1 third type domain(s), and the Q1 third type domain(s) is(are) used to indicate whether the radio signal(s) in the Q1 first-type air interface resource pool(s) is(are) correctly decoded, respectively.

15. The base station according to claim 13, wherein the third transceiver further transmits M1 downlink reference signals; a downlink target reference signal is one of the M1 downlink reference signals, and the second information is used to indicate the downlink target reference signal from the M1 downlink reference signals; a first receiving parameter set is used to receive the downlink target reference signal, and the first receiving parameter set is related to the first transmission parameter set; and the M1 is a positive integer greater than 1.

16. The base station according to claim 13, wherein a target first type domain is a first type domain corresponding to the first air interface resource pool in the Q1 first type domain(s), and the number of bits included in the target first type domain is related to the Q1;
    or the first radio signal comprises K1 first radio sub-signals, and the K1 first radio sub-signals are transmitted in K1 multi-carrier symbol groups, respectively; a target radio sub-signal is a first radio sub-signal in the K1 first radio sub-signals, the second information is used to indicate the target radio sub-signal from the K1 first radio sub-signals, a second transmission parameter set is used to transmit the target radio sub-signal, and the second transmission parameter set is related to the first transmission parameter set.

\* \* \* \* \*